US008616890B2

(12) United States Patent
Hughes et al.

(10) Patent No.: US 8,616,890 B2
(45) Date of Patent: Dec. 31, 2013

(54) SYSTEM AND METHOD FOR INTELLIGENTLY DETERMINING USER PREFERENCES AND RESPONDING THERETO

(76) Inventors: James Hughes, Chicago, IL (US);
Henry Hanek, Pequannock, NJ (US)

( * ) Notice: Subject to any disclaimer, the term of this patent is extended or adjusted under 35 U.S.C. 154(b) by 3051 days.

(21) Appl. No.: 10/444,719

(22) Filed: May 23, 2003

(65) Prior Publication Data
US 2004/0234932 A1    Nov. 25, 2004

(51) Int. Cl.
*G09B 23/28* (2006.01)
(52) U.S. Cl.
CPC ..................................... *G09B 23/28* (2013.01)
USPC ....................................................... 434/236
(58) Field of Classification Search
USPC ........................................ 434/236; 600/300
See application file for complete search history.

(56) References Cited

U.S. PATENT DOCUMENTS

| | | | |
|---|---|---|---|
| 4,124,214 A | 11/1978 | Pavis | |
| 4,735,199 A | 4/1988 | DiLullo | |
| 5,435,324 A | 7/1995 | Brill | |
| 5,601,432 A * | 2/1997 | Bergman | 434/118 |
| 5,718,247 A * | 2/1998 | Frankel | 128/898 |
| 5,961,332 A | 10/1999 | Joao | |
| 6,053,866 A | 4/2000 | McLeod | |
| 6,067,539 A * | 5/2000 | Cohen | 707/2 |
| 6,105,046 A | 8/2000 | Greenfield et al. | |
| 6,334,778 B1 | 1/2002 | Brown | |
| 6,655,963 B1 * | 12/2003 | Horvitz et al. | 434/236 |
| 2002/0007296 A1 * | 1/2002 | Yajima et al. | 705/8 |
| 2002/0143241 A1 | 10/2002 | Thorell | |
| 2003/0200205 A1 * | 10/2003 | Meiresonne | 707/3 |

OTHER PUBLICATIONS

Coats, Peggy and Wilkerson, Richard Catlett (Winter 1999). Dream Cyberphile. The Association for the Study of Dreams Cyberphile. Dream Time 16(1), 13 pages.*

* cited by examiner

*Primary Examiner* — Kesha Frisby
(74) *Attorney, Agent, or Firm* — James P. Muraff; Neal, Gerber & Eisenberg LLP

(57) ABSTRACT

The present invention provides a system and method by which a thought can be (a) entered, (b) interpreted through combination of an adaptive thought-associative dictionary and user knowledge, (c) processed with an analytical toolset, (d) presented back to the user, (e) stored, and (f) updated. Through feedback the present invention attempts to track the user with increasing accuracy, in the context of a non-stationary environment. The present invention fully associates these elements through use of a database such that post processing can be readily applied to any element, or can be applied as the ability to do such post-processing is developed or improves. Furthermore, the present invention defines a mathematical construct and relationship to the thought environment such that many forms of processing can be realized.

15 Claims, 17 Drawing Sheets

Attorney ~34
[n] a legal decision. ~36
comment: Get advice from Wallenstein and Wagner.

FIGURE 4A

Chicago ~38
M[n] a great, windy place. ~40
F[n] having a good time. ~42
　　　add: 0012345
44— comment: If you want good pizza, come to New York.

FIGURE 4B

SYSTEM AND METHOD FOR INTELLIGENTLY DETERMINING USER PREFERENCES AND RESPONDING THERETO

TECHNICAL FIELD

The invention relates to the analysis of thought. More specifically, the present invention relates to a system and method of intelligently capturing thoughts that are at least in part subconscious, and responding thereto.

BACKGROUND OF THE INVENTION

Thoughts and dreams, both originating in the mind, share characteristics which for many purposes may make them indistinguishable. In light of this, the significance of subconscious thought, including but not limited to dreams and daydreams, as applied in relation to a dreamer's life, has been clearly established in the psychology community. Therefore, for the purposes of the prevent invention, thought can include dreams and daydreams, and dreams can include thought and daydreams. There are structured attempts at dream analysis which have been discussed by those in the field of psychology. Researchers such as Freud and Jung have looked to dreams as important elements in the diagnosis and treatment of psychological illnesses. The foundations they provided, along with subsequent developments by others are certainly meaningful, despite the many controversies and inconsistencies which exist. In general, however, the typical analysis methods are vague and complex, based on opinion as much as on science. In addition, the awareness and application of these ideas is limited to rather small groups of "experts". Most people have little interaction with these "experts", and are largely unaware of their body of knowledge.

Apart from the specialized field of dream research, personal dream interpretation and application is performed by the masses in a largely unstructured manner, without serious foundations in psychology or analysis. This informal analysis may present itself in the form of conversations or other interactions between people, or may evolve in the private contemplations of an individual. However, there exists no formal means by which quantitative analysis, tracking and storage can be performed. Consequently, any analysis is limited by the individual's memory, analysis ability and ability to manage an ad-hoc recollection of their past dreams. Generally, people do not apply mathematical methodologies and tools to the processing of their dream content (e.g. statistical analysis). Currently there is no known application of modeling and analyzing dream information based on the mathematics of normed linear spaces. As such, there is no reliance on state-theoretic or digital signal processing concepts for any known type of dream analysis.

Literature suggests methodologies by which people informally track their dreams over time by writing them in a notebook or using word processing equipment to record dreams. This approach is a personal means of dream interpretation and application, and does have merit. However, these methods are limited in at least three major ways. First, keeping written or computer records of dreams does not provide the proper structure to allow formal mathematical methodologies to be applied to the analysis. For example, it would be virtually impossible for a person to correlate the content of their dream with the complete real-life past history of themselves or others. Second, currently available or generic computer applications do not provide a framework by which an organized approach to the entirety of (a) dream entry, (b) storage and retrieval, (c) analysis, (d) processing and/or (e) the linking of all such elements can be achieved. Third, personal analysis is initially devoid of all connection to the collective meanings of the world or is based solely on the dreamer's knowledge of our world. Any interpretation or benefit from dream analysis is necessarily limited to the dreamer's own abilities as they perform the analysis independent of the knowledge of others, or only to the extent that they are made aware of.

This last deficiency can be addressed through use of one of the many commercially available books on dream interpretation. These books attempt to apply a collective knowledge of society, culture or life to the interpretation of an individual's unique dream content and allow an untrained person to associate a specific environmental, cultural, or life meaning to specific dream content. However, these books are likely to be tainted with an "expert's" flawed viewpoints or unscientific principles such as the zodiac, astrology and mythology.

While properly constructed books can provide a starting point for dream analysis, they have many shortcomings. First, they are static in representing the world through their content. As environments, cultures and experiences change, elements of the book become obsolete. There are no means for real-time tracking of these things. Further, books do not allow a progression of a dreamer's awareness to influence the book's content. As people associate dream content to unique elements of their lives, there exists no means to update the book to provide a representation of individual users. This philosophy applies a one-book-works-for-all approach, which promotes the conformity of an individual's uniqueness to an accepted, yet flawed body of knowledge. In general, such overconstrained problems have no solution, but at best just try to minimize the errors which are necessarily present. A further disadvantage is the lack of a means by which the experience of people using the book can influence the contents of the book. Such a capability is a requirement for modeling the collective knowledge of society, as the person using the book is a member of our society, and must be included if the book is to provide a complete representation of such. Finally, as described above, the use of dream interpretation books does not support structuring of dream histories of individuals or groups of people to perform advanced analysis and processing of data.

When considering the field of psychology and the attempts to practically represent it in the form of books, a final weakness of current methodologies is evident. There exists no definitive means by which a person may establish the qualifications of an authority to correctly interpret dreams or apply them to any end. In addition, it is widely accepted that it is not possible for a given person to completely understand the dreams of another (U.S. Pat. No. 4,124,214 to Pavis 1978). A dream interpretation "expert", if not the person having the dream, is not completely aware of all elements of the dreamer's mind, experiences, and existence. Thus, they are blind to certain (most likely quite large) subsets of the dreamer's existence. If the dreams of an individual, over the population, are a function of any and all elements of a person's mind and experiences, a dream interpretation "expert" will fail to consider and address certain elements in their interpretation, and thus will be incorrect in their analysis. Because all people, things and even perceptions of identical events are different, there exists no person other than the dreamer themselves who can hope to achieve the true interpretation of a dream. As such, use of a book written by an "expert" is a flawed approach to dream interpretation.

As for consultation with psychology experts, there exists a path by which the expert may learn from the dreamer through personal interactions. Again, it is clear in this case that the expert is not the one having the dream. The expert's decisions as uniquely related to the dreamer, are limited by: (1) the capabilities of the expert in determining relevant information from the dreamer's mind, (2) the capabilities in information exchange between the dreamer and the expert, (3) the willingness of the dreamer to reveal personal information, (4) the expert's analysis abilities, and (5) the other imperfections of the expert (i.e. the doctor is not necessarily more healthy or more capable than the patient). As a result of the practicalities of (1), (2) and (3), the expert will never know the complete composition and make-up of an individual's mind and personal history. Complete interpretation without complete knowledge of the world and the individual's unique experiences is impossible because an individual's dream is created by that specific individual, and is a function of that individual's unique experiences and history. The expert's knowledge of our world is most likely based on the books described above, and thereby shares the same limitations. Furthermore, because of the difficulties or impossibilities in communicating both the concrete and abstract elements of one's mind and unique experiences (i.e. the dreamer's reality), dream interpretation by a psychology expert will fail to achieve its intended objective.

In addition to dream interpretation is the concept of making use of the dream. There must be some benefit to analyzing dreams (enjoyment, creativity, life improvement, etc.) or this action would not take place. An individual is the one who is living their life, is responsible for that life and receives the benefits of their dream interpretation. As a result, an individual forms a natural mechanism by which their past and present actions affect the future. An external psychology expert is not an integral element of that loop, but merely a disconnected observer and driving force. As a result, the application of dreams to the shaping of the future is necessarily distorted by the interface between dreamer and interpreter. Only under certain conditions will this arrangement allow a person to benefit from their dreams. In general, a person's distorted view of reality will be mirrored in a distorted interface with a psychology expert.

This argument can be strengthened by consideration of the following: every person's reality was formed by that person, based on their experiences in life. When something is true or untrue, the concept is tested by that individual until an internal model of truth is constructed. Such a model is unique to the person, and was created (at least in part) independently from other beings, including psychology experts. As a result, it is impossible for others to be aware of the complete details of such a model, especially to the point of providing guidance. Many elements of how a person relates to reality will always be known only by that person. Therefore, there exist certain elements of an individual's past, present and future path, for which only that person was and is in the loop. Only when a methodology is inserted into the loop (person enters data in, learns through history, processing of output) can their reality be transformed in a convergent manner. In addition, only with such an arrangement can errors in the interpretation be reduced, as the dreamer's awareness increases and becomes modeled in the capabilities of the tool, in a type of feedback loop. With respect to dream interpretation, there is no known method which combines world knowledge, self knowledge and an error correcting feedback loop. In addition, there is no known implementation of such on a computer system.

There is evidence in the prior art of using computers to aid in the diagnosing of patients with mental disorders, and to enter and store dream data to assist in this objective (U.S. Pat. No. 5,718,247 Frankel 1998). However, such examples simply acknowledge the importance of dreams, without providing a clear description of the methods to be employed. Generally, diagnostic references show a therapist as an essential part of the process and do not establish the patient as being empowered to autonomously perform analysis and make decisions. This is merely the traditional methods described above, with the additional use of public-domain computer concepts to enter, store and organize the patient's dream occurrences. With respect to psychotherapy, the concepts of (A) cultural differences, (B) closed-loop feedback, (C) customization and adaptation to unique users, (D) non-judgemental therapy, (E) life as a non-stationary process, (F) distortion due to the therapist, (G) automated dream interpretation, (H) analysis based on mathematical foundations, (I) dreams and dream histories as functions of time, (J) user/dreamer emotions and states as vector functions of time, (K) consideration of the dream data of other people in a patient's life/world and (L) providing therapy to an unlimited number of people concurrently are never discussed. Finally, it should be noted that dreams have broader application than use in diagnosing mental illness.

Regardless of the methodologies employed, the current state-of-the-art in dream interpretation does not support the sharing, use or storage of the dream content of a large number of individuals. As previously stated, some examples do involve the storage of dreams. However, these examples are directed toward obtaining data under the direction and control of a doctor, to assist in the diagnosis of mentally ill patients and not serve the specific interests and needs of the general population. There is no means established (A) to acquire the dreams of "normal", uncategorized or unidentified people, or (B) for individuals (both "normal" and mentally ill) to share this therapist-controlled data outside of a doctor's office. Considering again the formulation of "expert knowledge" on dream interpretation, if it is accepted that each and every person contributes to the content and evolution of our world, life, etc., then each and every person's knowledge must be utilized to form an average, or typical interpretation of a specific dream element. Individuals, psychologists, and book authors using current methods, cannot make use of realtime information from the global population.

The traditional methods which form a part of the aforementioned examples are also limited in their scope. As previously stated, no known forms of dream interpretation employ a feedback mechanism to allow convergence of a user's dream interpretation with their reality. When applied toward helping an individual with psychological problems, experts attempt to form definitive action/reaction solutions to a problem which is present in an adaptive individual, living in a non-stationary environment. For example, when a person's physical and mental composition is altered by a prescribed drug, there is no means to address or even acknowledge that this "solution" may be in error. Conversely, when stable feedback mechanisms are employed, it is accepted that errors exist which converge to zero as time increases. Thus, the traditional dream interpretation techniques do not acknowledge that the means toward a solution are as meaningful and as important to the person's awareness as the ends achieved by those means. Finally, there is no means and process to (A) link advertising or helpful information with the direct subconscious thoughts of a person, and (B) specifically store and process large amounts of historical and current dream data when an individual records and analyzes dreams or consults with an expert. A computerized tool specifically designed for dream interpretation is well suited to both of these applications. Item (B) provides an immense capability in data fusion to achieve a multitude of objectives. Such a system is the only known means by which an individual's needs for dream analysis may be satisfied, while at the same time serving a community's or the nation's need for situational awareness.

The present invention is directed to solving these and other problems.

SUMMARY OF THE INVENTION

In accordance with the present invention, a thought analysis tool with analytical processing and data fusion capabilities consists of a framework to interface a user with the computer program, allowing data entry by the user and data display to the user, a process to develop, link and display interpretations of a user's thought, generated both from the user's input and expert knowledge, a process to update, modify, delete or add to the interpretation database, a process to allow the user to update and store portions of their thoughts, a process by which the user can associate emotions or other state data with portions of their thought text, a process by which the user can add comments to be associated with a given thought or thought interpretation or processing, a method to encrypt and share thoughts with other users, a process of storing and processing a history of user's thoughts, a process of displaying to the user the emotional or state content of a thought, a process of providing beneficial or entertaining information to the user, based on thought content, a process of correlating and identifying for the user similarities in thought content, emotional content or state content over their own histories or those of others, a process of applying data fusion to the thought environment, a process of linking advertising or other user-specific information to thought content, a process of using user entries to update a collective associative dictionary of thought interpretations, and/or a process to update the interpretation database in order to refine the interpretations to consider present state of mind interpretation over time, in an open or closed loop manner.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

BRIEF DESCRIPTION OF THE DRAWINGS

FIG. 4A is a listing of one embodiment of a collective dictionary entry;

FIG. 4B is a listing of one embodiment of a collective dictionary entry;

DETAILED DESCRIPTION

The present invention provides a system and method by which a thought can be (a) entered, (b) interpreted through combination of a collective thought-associative dictionary, an adaptive user thought-associative dictionary and/or user knowledge, (c) processed with an analytical toolset, (d) presented back to the user, (e) stored, and/or (f) updated. The present invention associates these elements through use of a database such that post processing can be readily applied to any element, or can be applied as the ability to do such post-processing is developed or improves. Finally, this capability is provided to an individual user, with privacy and without the need to be scrutinized by others.

The present invention may be implemented in any form of applicable technology, including but not limited to the following: computer and circuitry types: electrical, digital, analog, optical, magnetic, mechanical, or any combination thereof. In addition, the system chosen to implement the invention may be general purpose, embedded, portable, networked, client/server, web server, database server, wireless or any combination thereof. The invention may also be made part of items designed primarily for other purposes, including but not limited to phones, personal data assistants and toys. In addition, user input may be obtained through various means including but not limited to keyboard, computer mouse, punch cards and speech recognition. Output devices include but are not limited to cathode ray tube, light emitting diode, liquid crystal display, vacuum, flourescent or plasma displays, speech synthesis, printers and plotters.

In one embodiment of the present invention, a thought analysis system and method is implemented in an interpretation engine and analysis engine. The interpretation engine allows the user to enter a thought, form interpretations, associate all pertinent data to the thought or portions of the dream, and store the thought and all pertinent data. This process can be repeated over time to create a history of data. The analysis engine takes the current and/or history thought and data, and performs processing operations on this data. The processes of the interpretation engine and the analysis engine can be repeated recursively as each engine is affected by the other and the dynamic user.

Interpretation Engine

Figure 1:
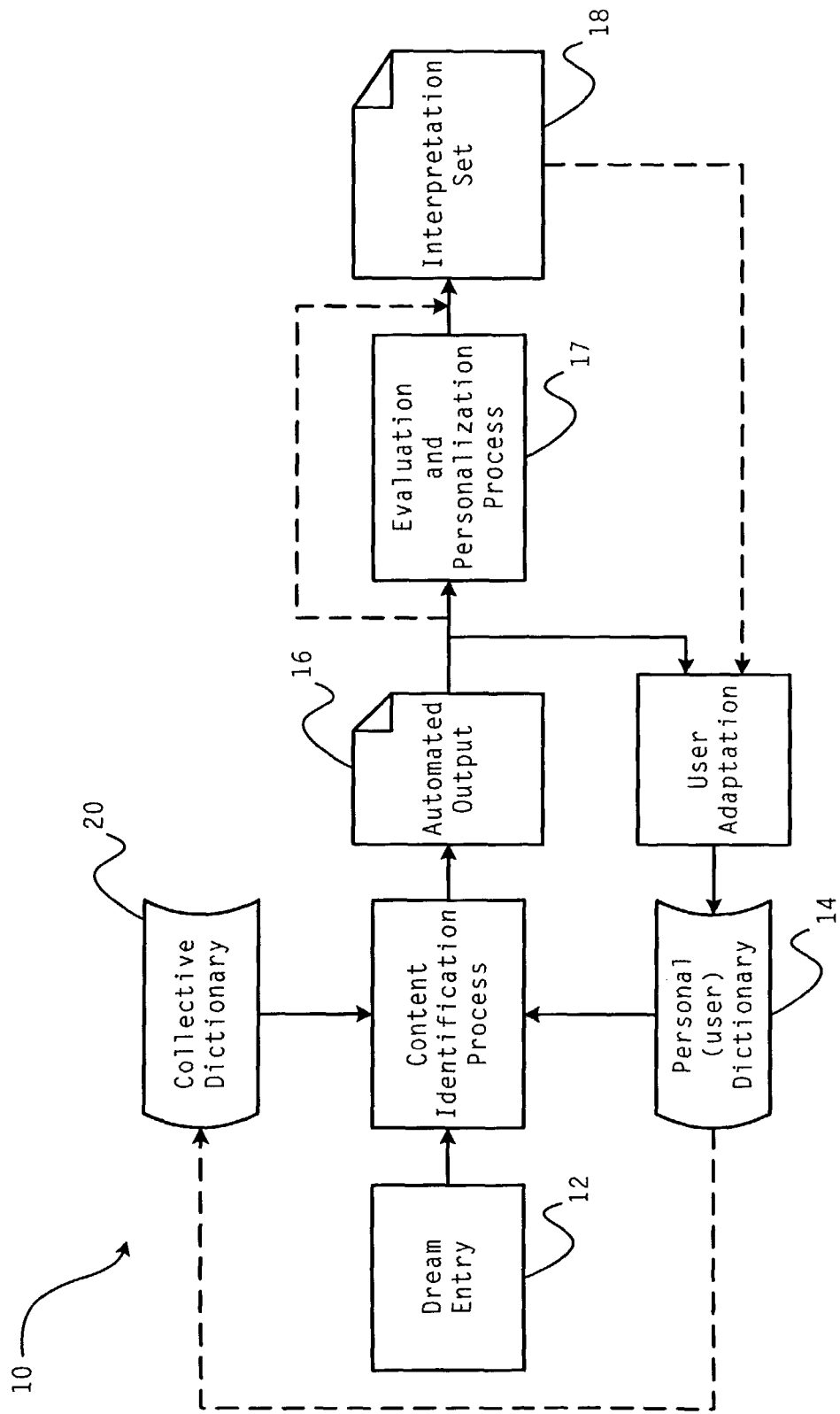
FIG. 1 is a block diagram of one embodiment of the process of the dream interpretation engine.

The interpretation engine of the present invention is shown in FIG. 1 through FIG. 9. FIG. 1 provides an overview of one embodiment of the core process, while a higher level of detail is shown in the subsequent figures. These details are provided to help in both describing the process and in showing how it meets the objectives set forth in the previous section. In addition, the ordering of operations is meant for illustrative purposes, and is not meant to preclude different permutations of such, except as logically prohibited by the dependence of operations.

In the preferred embodiment of the present invention, the thought may be a conscious thought, an unconscious thought, and/or a subconscious thought. Preferably, the thought is a dream that occurs while sleeping or a day dream that occurs while not sleeping. FIG. 1 shows an overview of processes performed by the dream interpretation engine 10. The user enters dream data at a dream entry point 12. The dream data may encompass rememberable or known circumstances and/or events, time, duration, date, and/or content. In addition, the dream data may include categories such as external conditions to determine the effect of the external conditions on the user. Examples of external conditions include, but are not limited to, temperature, air pressure, season and/or conditions that can be detected through taste, touch, sight, smell, or hearing. External conditions may also be generalized to include those which may not be sensed, but are otherwise known to the user.

The dream entered is subsequently processed by the dream interpretation engine 10 to identify important content, as will be described in detail below. Based on this output, the user may iteratively repeat the process, while updating a personal dictionary 14 to more closely represent his or her viewpoints or knowledge. Over time, the personal dictionary 14 will converge to a unique representation for that user. Ultimately, the result of this step is the generation of a file 16, produced automatically by the tool, which identifies and interprets important dream content for the user. The file may be a data file of data that makes up, points to, or otherwise knows the identification of the file 16.

The user can utilize the file 16 as the final dream interpretation set prior to the evaluation and personalization process 17, or may further evaluate and personalize the output through the evaluation and personalization process 17 to form an interpretation set 18. In FIG. 1, this is shown through the line which goes from the output of the automated output directly to the input of the interpretation set 18. The interpretation set 16 or 18 may be a file or data that makes up, points to, or otherwise knows the identification of the interpretation of the dream. The interpretation set 18, over and above the automated output 16, further comprises a narrative interpretation of the user's dream, which the user may deem necessary to further explain or describe at least a portion of the automated output 16 of the user's dream. The user manually enters the narrative interpretation based on their personal knowledge and the output of the automated dream content identification 16. The entire process and some additional features are described in greater detail below.

As mentioned above the present invention comprises a personal dictionary 14 which converges to a complete unique representation of a specific user. The system comprises a built-in dream-associative dictionary which provides a baseline dictionary of dream interpretation and analysis. The baseline dictionary provides a starting point for the user by providing current state-of-the art dream-associative definitions. The system allows a user to add, delete and/or modify these dream-associative definitions, which are then given a representation in 14 in order to update the definition through an interface. As a result, the intelligence used to analyze the meaning of the user's dreams (a) evolves/converges to become a representation unique to the user, representative of that user's experiences, culture, outlook, etc., (b) evolves/converges to move away from associations which do not apply or are objectionable to the user, and/or (c) is allowed to benefit from evolution of or increase in the user's awareness in time, or as future events transpire. This evolution/convergence can be directed to the present relative conscious or subconscious perspective of present or past events. In the large picture, the only person who can really interpret a dream is the person who had the dream, and the tool supports this philosophy and the feedback mechanism necessary to implement it. Thus, in one embodiment of the present invention the process to update the interpretation database refines the interpretations to consider present state of mind interpretation over time in a open or closed manner through user adaptation (present perspective of at least one dictionary definition in view of the previous or current automated output 16 and/or interpretation set 18). In one embodiment, this is preferably performed in a closed loop manner, as shown in FIG. 1.

The present invention may further comprise a collective dictionary 20 that is based upon the collection of vast amounts of dream data over a diverse user base, as well as an interface for updating the collective dictionary 20. The system can also obtain an equivalent diversity in the storage of customizations applied by the users to the personal dictionary 14. As a result, information from and about individual users can be utilized to better define the collective intelligence in the baseline dictionary of dream interpretation intelligence. In this manner, there may exist different collective dictionaries 20 in time, or as a means to achieve compatibility with desired user or sociological target groups. In one embodiment of the present invention, the collective dictionary 20 can be the starting point for the personal dictionary 14. Likewise, the personal dictionary 14, can be used to update the collective dictionary 20, as shown in FIG. 1. A collective dictionary 20 keeper (manager) can decide on parameters for the use of user dictionaries 14, particular groups or subsets of user dictionaries 14, and/or particular aspects thereof to update the collective dictionary 20. The parameters, once entered by the keeper, can be used to automatically update the collective dictionary 20. Decisions on which parameters should be used can also be automated.

Figure 2:
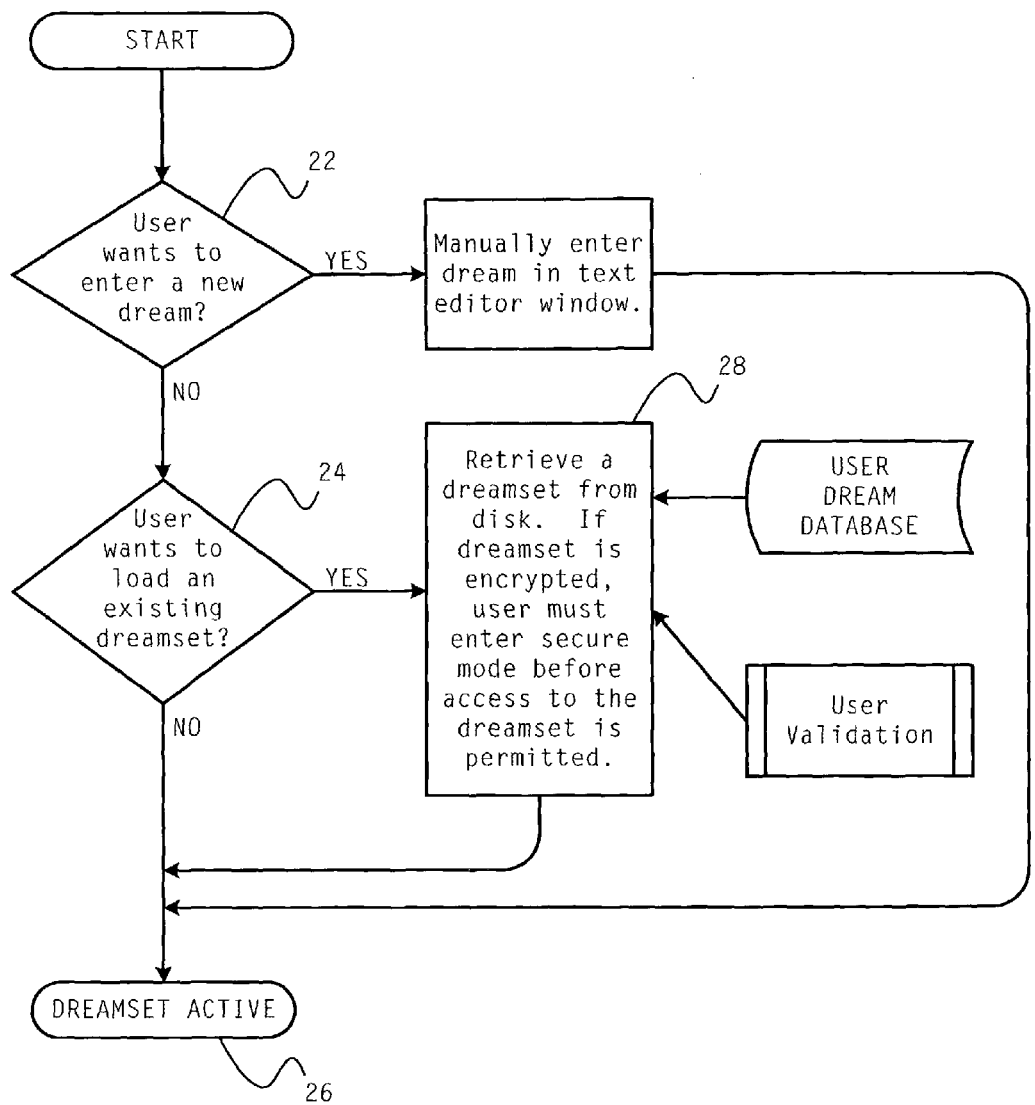
FIG. 2 is a flowchart of the dream entry step shown in FIG. 1.

FIG. 2 is a flowchart of the dream entry step 12 shown in FIG. 1. Once the dream data is entered into the system it is called a dreamset. More generally, a dreamset comprises the dream data, and the data, information and/or knowledge developed through subsequent processing/operations. In the initial dream interpretation and analysis process, the user can enter his/her dream in text format 22, or recall an existing dream (entered at a previous time) from storage 24. In addition, the entry may be in the form of an audible recording, a visual recording, and/or any multimedia format. Once this is accomplished, the dreamset is referred to as "active" 26, and is available for processing and analysis. Each processing and analysis step adds information to the data which exists before the step was performed. Further, the processing/analysis steps are in general not mandatory, but are applied at the discretion and under the direction of the user.

If the user selects to use a "secure mode", use of the engines and tools therein by the user is not impacted, but storage and retrieval from the disk is handled with use of encryption algorithms 28. This is intended to prevent unauthorized access to a user's dream and analysis information. Note that secure mode can only be entered after the user has been validated. Validation may occur, for example, through use of a password.

Figure 3A:
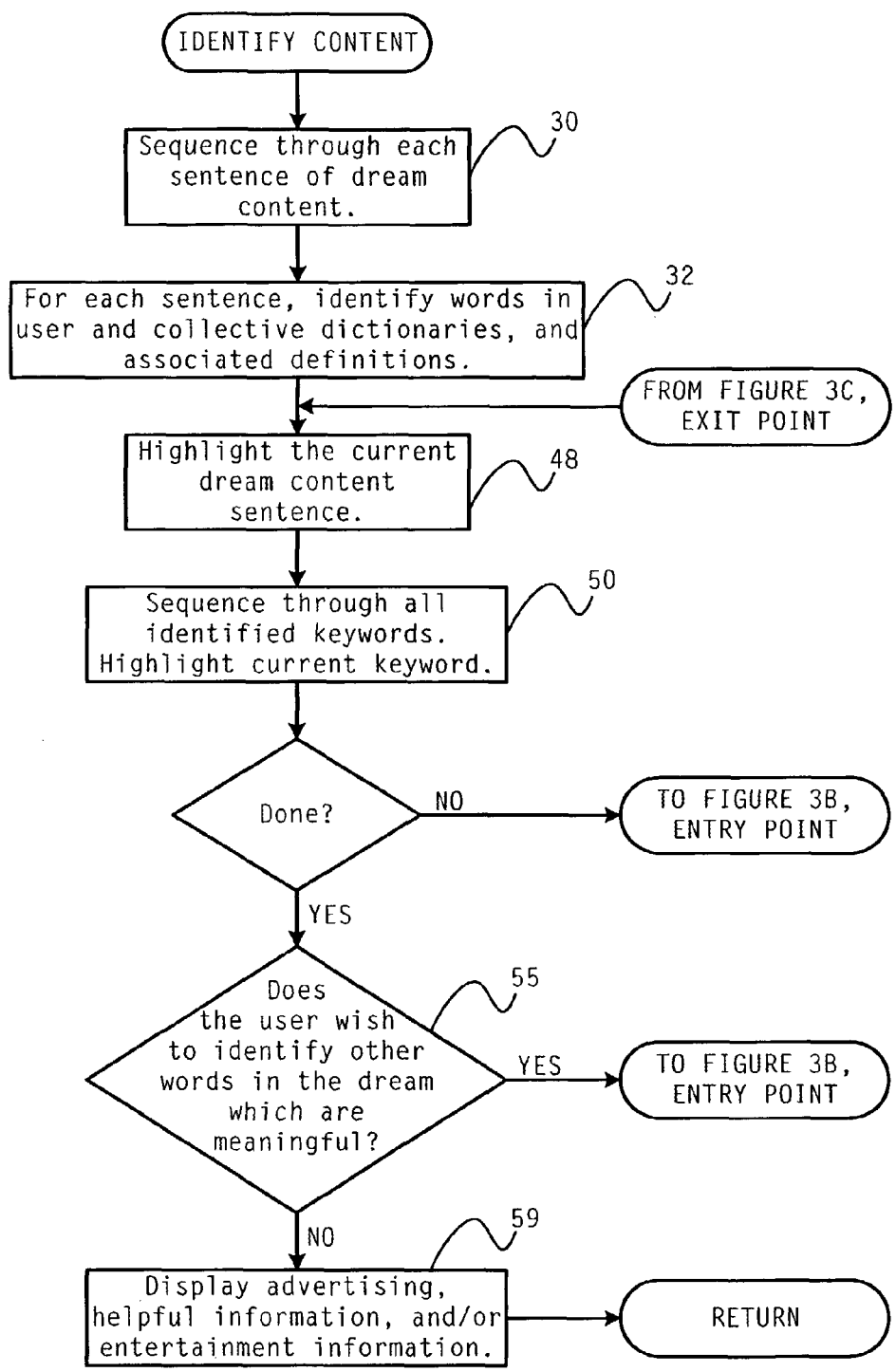
FIG. 3A is a flowchart of one embodiment of dream content identification and interpretation.
Figure 3B:
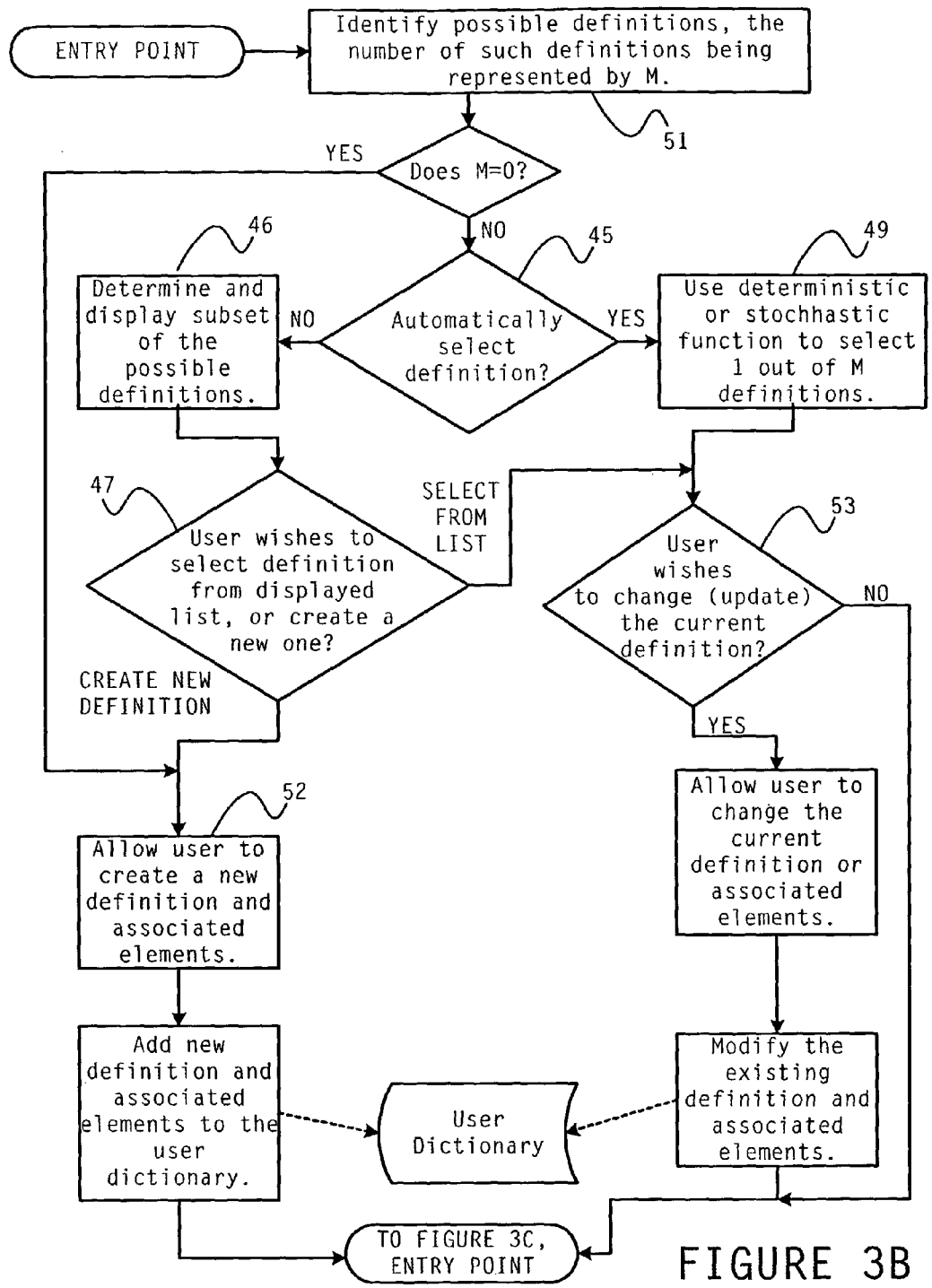
FIG. 3B is a continuation and embodiment of the listing of FIG. 3A.
Figure 3C:
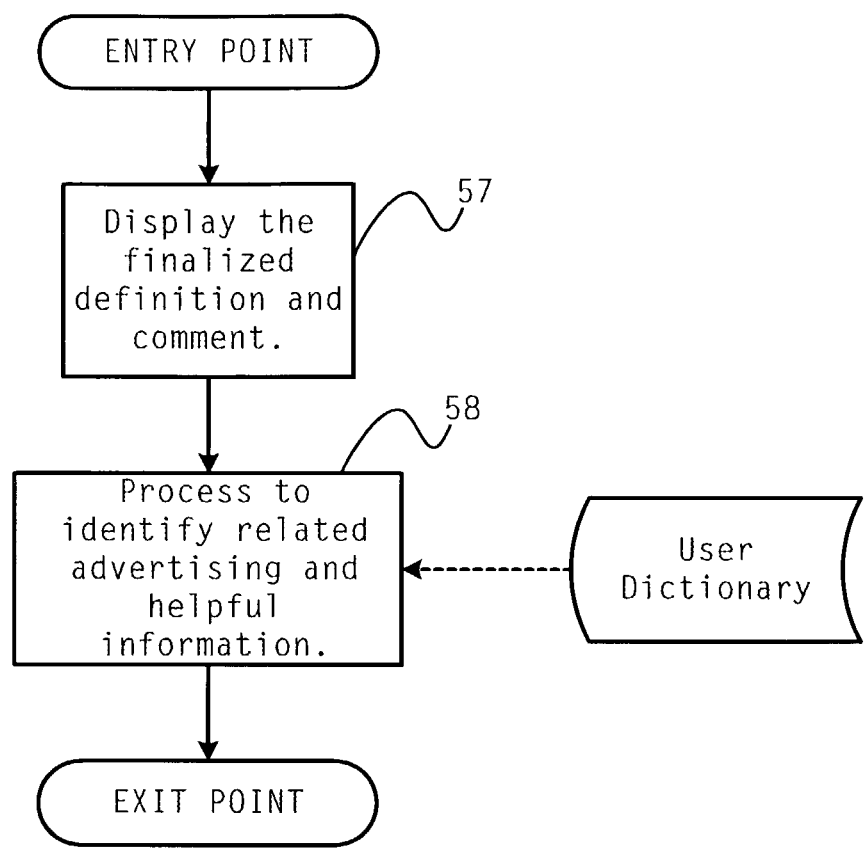
FIG. 3C is a continuation and embodiment of the listing of FIGS. 3A and 3B.
Figure 5:
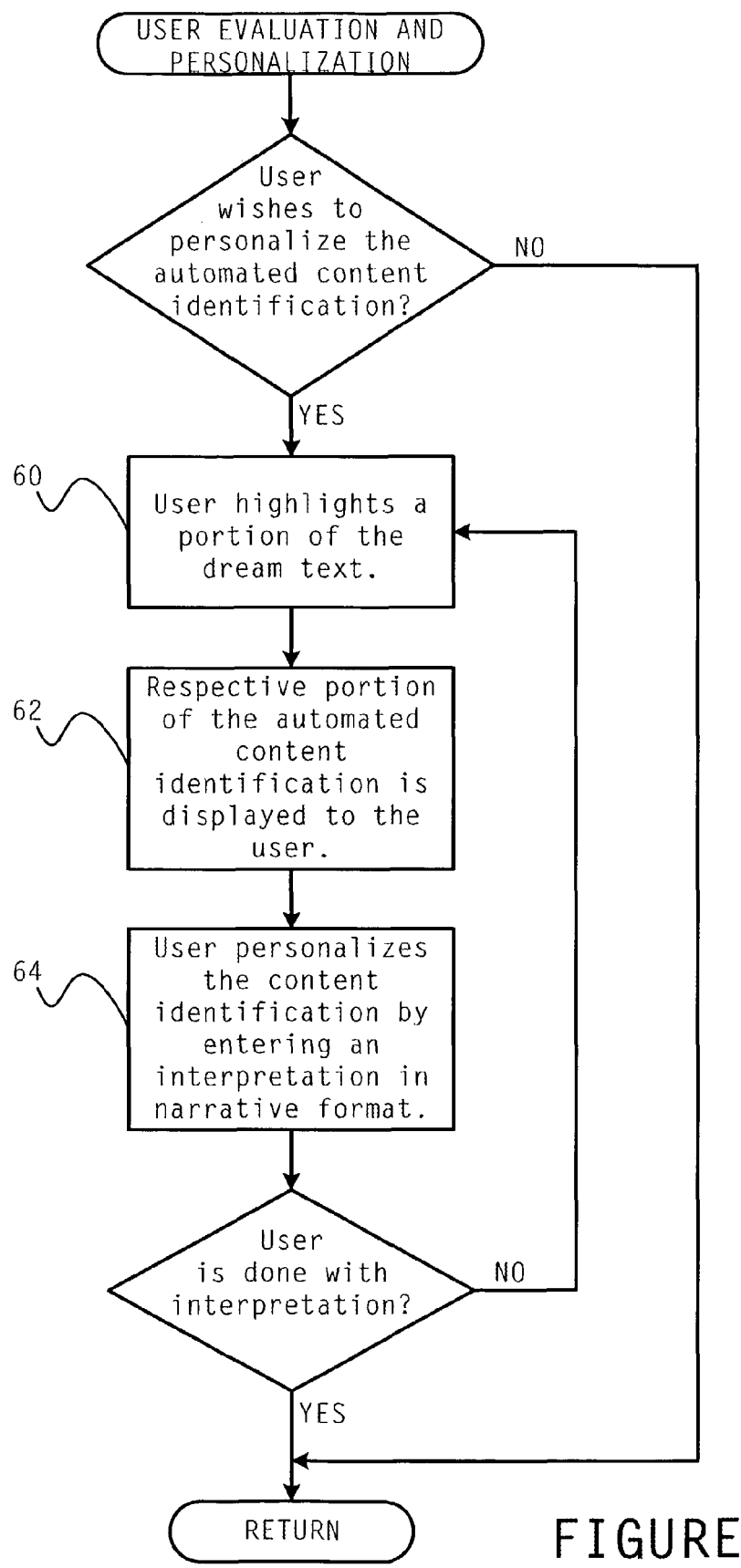
FIG. 5 is a flowchart of one embodiment of interpretation of subsets of the dream content.
Figure 6:
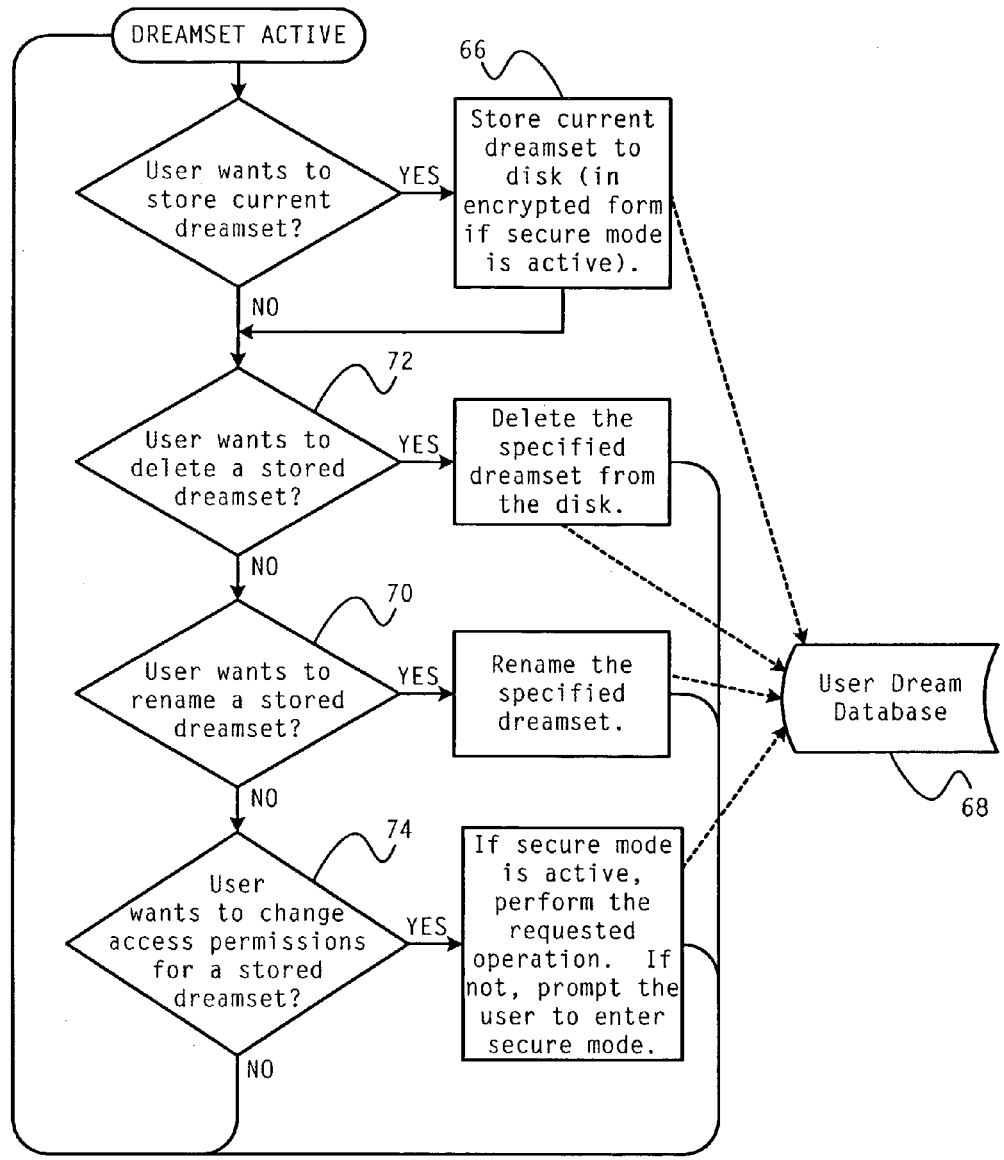
FIG. 6 is a flowchart of one embodiment of showing the steps of saving the dream and associated data.
Figure 7:
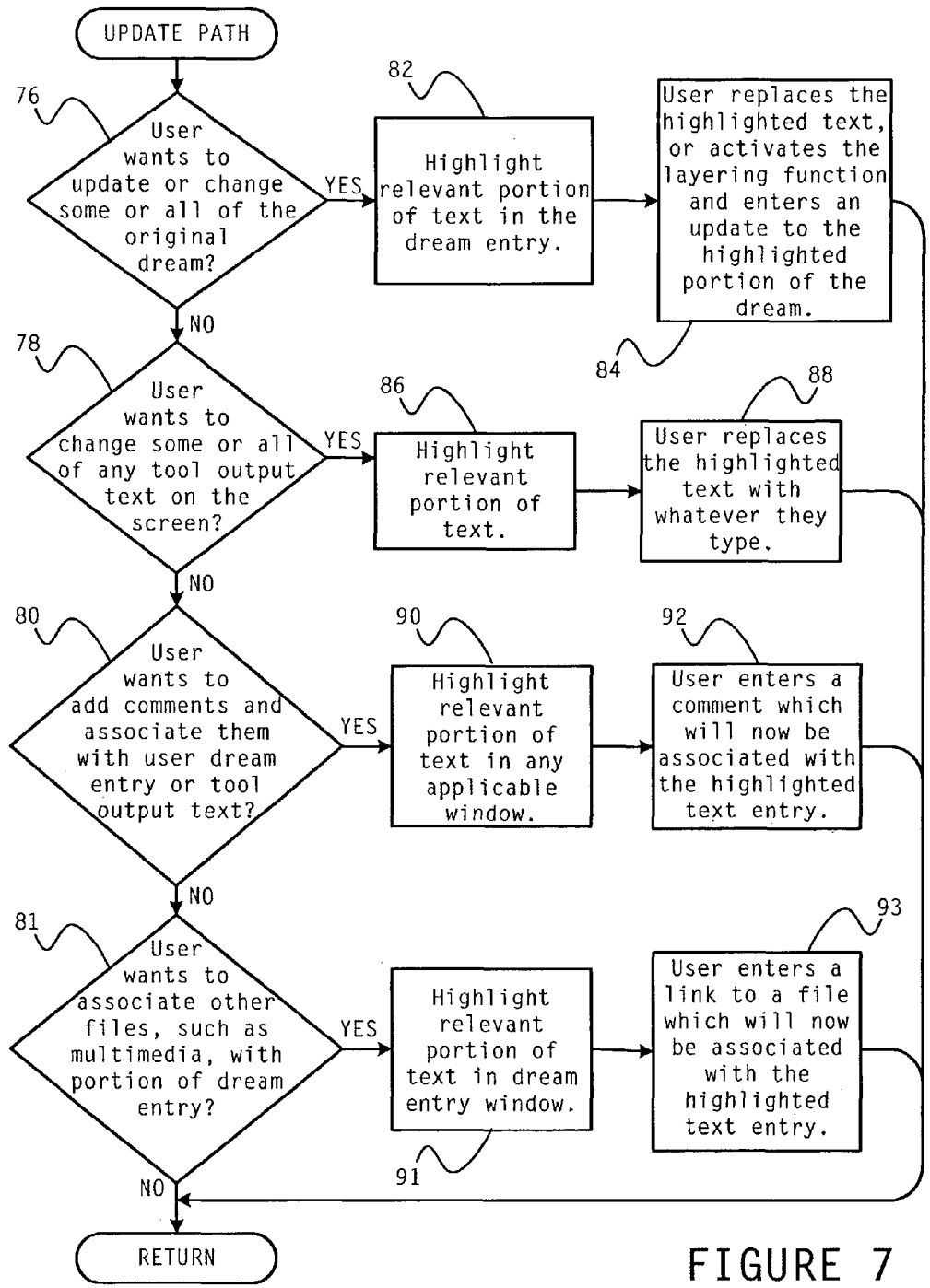
FIG. 7 is a flowchart of one embodiment for updating the dream, interpreting or analyzing content and adding comments.

With an active dreamset 26, the user may invoke a content identification/interpretation engine, as shown in FIGS. 3A-3C, to provide definitions for important words/dream content, and also change these definitions. Further the user may add their own interpretation to the entirety or subsets of dream content as shown in FIG. 5. At any point, either before or after the steps described above, or any other operation described in this section or the section covering the Analysis Engine, the user may save the dream, as shown in FIG. 6, including any other associated items (the entirety referred to as the "dreamset"). The user may further update or change portions of the dream text or any output text and add comments, either general or linked to specific portions of the dream text or any other text, as shown in FIG. 7. Also, as shown in this figure, the user may associate with or include other data or files with the dreamset. These data items or files may be generated independent of this embodiment, and may include such things as arbitrarily relevant information, or multimedia such as digitized sound, and/or digitized video, pictures, photographs, or drawings.

After the dream entry, as shown in FIG. 2, the meaningful content may be identified using automated means, manual means, or a combination thereof as shown in FIG. 3A-3C. The system scans through all words of the dream entry, on a sentence-by-sentence basis 30. All words in the user's dream, which are present in the user's dictionary 14 or in the collective dictionary 20 are identified 32. To each of these identified words is associated one or more "definitions". To each definition "additional definition information" may be associated, including but not limited to: (A) information to aid in grammatical application (i.e. the part of speech applicable to the definition), (B) other data to determine applicability to a user (i.e. gender associated with the definition or geographical region), (C) emotional state or generalized state, (D) intelligent advertising catagorization or links, (E) additional comments, such as positive messages to the user or entertaining comments for the user, and/or (F) any other information which may be relevant to the definition or the application of that definition. The collective dictionary 20 contains "definition" and "additional definition information" and is provided with the tool to form a baseline interpretive ability. In one embodiment of the present invention, the collective dictionary is a file for the human-generated based on expert knowledge, and has a format similar to the sample shown in FIG. 4A and/or FIG. 4B.

As noted, the additional information may include emotional association, intelligent advertising, and positive messages. The emotional association provides a means by which emotional states are clearly and distinctly associated with arbitrary portions of dream content. This association is quantitative in nature with isomorphism to elements of a multi-dimensional normed linear space. Therefore, the association supports the unlimited possibilities of statistical and mathematical analysis, visualization and processing. This capability adds a second dimension to the dream analysis. In addition, the data consisting of the dream narrative, definitions and interpretation, with associated emotional data can be utilized for other applications such as the training of artificially intelligent machines or the "teaching" of emotion to a computer.

The emotional association is extended through the concept of state association to provide a generalized framework by which any state of the dreamer, both within the dream and in reality may, be represented and associated with arbitrary portions of dream content or segments of time. Again, these representations are quantitative in nature, and are based on the definition of a basis or a set of vectors which are capable of at least spanning the user-defined state-space. This capability extends the dimension of dream analysis to an arbitrary integer N, where each extension adds an arbitrary-length vector or sub-vector representing an arbitrary state of the dreamer.

In addition, the additional information may include intelligent advertising. Intelligent advertising provides a means by which the thoughts, as present in dreams, are utilized to structure the presentation of advertising or other information helpful to the user. This concept can be further extended by closing the loop and allowing the advertising links selected by a user with a certain dream content and history to be used in adjusting the associative function.

Finally, the additional information may include positive messages. Positive messages provides a means to associate messages with dream content, such that helpful comments or advice may be communicated to the user. Since these messages are linked to dream content, they are linked with the user's subconscious thoughts.

FIG. 4A and FIG. 4B shows two fabricated, simplified entries. For example, if a user has the word "attorney" in their dream, the collective dictionary (sample) entry 34 would indicate that "attorney" as a noun represents "a legal decision" 36 to all users. However, the word "Chicago" 38 in a dream would represent "a great, windy place" 40 to a male user, or "having a good time" 42 to a female user. In addition, advertiser 0012345 44 is linked to the presence of "Chicago" in someone's dream. Advertiser 0012345 44 may be the Chicago Board of Tourism. This link to advertising may be used to guide actions toward a commercial end, such as the presentation of advertising, marketing information, coupons, and/or links to a website. Note that the item in brackets in FIGS. 4A and 4B is the part of speech to which the definition applies. Given the context of a word within a dream, the dictionary part of speech entry may be utilized in conjunction with a grammatical parsing algorithm to select an appropriate definition.

Referring again to FIG. 3A-FIG. 3C, the system displays the user's dream, sequences through the identified words 48, and designates the identified words 32 in sequence, one at a time 50. For each designated word, the system may (A) select and display a definition determined by the system 45, (B) display a subset (not necessarily proper subset) of respective definitions 46 and allow the user to select one from this set 47, or (C) allow the user to enter their own (custom) definition to be associated with the designated word 52. The actual action employed (A), (B), or (C) depends on the mode of operation selected by the user. Further, for choices (A) and (B), the system may perform processing of the user's input, past histories, or other data (such as "additional definition information") to determine either its choice 49 or the choices available to the user for selection 46. This processing may be described by a general mathematical function. Some examples would be an artificial neural network, or any other type of deterministic or stochastic data classifier. Once a definition is selected (for choices (A) and (B)), it is displayed and the user is given the opportunity to update the wording of that definition 53. Such an update may either be applied globally to the user dictionary, or may be linked to other data to make this definition update apply in a dependent manner. Regardless of which dictionary (collective or user) the definition came from, all changes will be recorded in the user dictionary. If the original definition was from the collective dictionary, it will be "overridden" by the new user entry for all subsequent processing. Also at this point, a comment (see "additional comments" in the section describing "additional definition information") may be displayed to the user 57. In the example file (FIG. 3C), a comment would be displayed to the user dreaming of Chicago. The user has the same abilities to modify this comment, if desired.

The above process is repeated until all words in the user's dream have been processed. At this point, the user is given the opportunity to select any words in his dream 55 and either (A) add a definition and other data to the user dictionary 52, or (B) change the existing definition in the user dictionary 53. Again, the changes may be applied in a global or dependent manner. When all is completed, the definitions, constituting the dream content interpretation become part of the dreamset data. Moreover, the updated user dictionaries may be retrieved from a set of users to be processed toward creating an updated collective dictionary.

Finally, an associative function 58 may also be implemented for purposes of displaying commercial interests to the user 59. Such a function would relate the interests of groups (i.e. advertisers) to a user's dream content. As an example, this association may be applied by the creator of the baseline collective dictionary, as described above. In its most basic form, if an advertiser is linked to a certain keyword, an event can be triggered upon the presence of that keyword in a user's dream. For example, if a certain restaurant (e.g. McDonald's®) is linked to the word "hungry" in the dictionary, an advertisement for this restaurant may be presented to a user whose dream mentions being hungry. Generally, the association of advertising or other information to a person's dream may be accomplished by a mathematical function, with possible adaptive features. Some examples would be an artificial neural network, or any other type of deterministic or stochastic data classifier.

FIG. 5 is a flowchart wherein the user can add their own interpretation to the entirety of subsets of the dream content. This figure addresses the user evaluation and personalization process 17. The user highlights a portion of text in the original dream entry 60. Included keywords and their definitions are then displayed in the automated output window 62. Making use of the identified content data/definitions, the user may then personalize the interpretations related to this section of dream in the interpretation window 64. The process repeats until all meaningful portions of dream text have been addressed by the user. Of course, the user may also choose to highlight the entire dream, and thereby perform the user interpretation operation in one step. Preferably, the user interpretation is in a narrative format, written by the user and based on the keyword definitions and the user's own knowledge, judgement and insights. It also should be noted that this step is optional, as the user may consider the automated content identification as the interpretation, as shown above in FIG. 3C.

FIG. 6 is a flowchart showing the steps of saving the dream and associated data. The dream and all other information entered by the user is stored and stored in a database within a storage medium and saved to a storage medium such as a disk 68 in this operation 66. In addition, all analysis information and tool outputs are saved to disk as associated elements. Some additional information may also be included, such as the date, time, user profiles, categorizations, etc., which is entered by the user in a Graphical User Interface (GUI) dialog box or equivalent. This information may be utilized in performing querries, correlation analysis and other history tracking and management.

If the user has activated secure mode, then all files saved to the disk 68 are first encrypted before they are stored 66. The intent of the encryption is to prevent an unauthorized user from accessing plaintext dreamset data. Once saved, the dreamset data becomes part of that user's "history". The entire history forms the basis for time analysis of dream and life progression by the user and allows certain types of analysis to be performed jointly with data from other users. At any point, any dream from the history may be recalled and the information in it changed or updated in the same manner as for a dream currently entered, as described above. In addition, given the appropriate permissions from the originating users, dreamset histories may be viewed and shared among a group or group of users.

At any point up to and including the "save" operation, the user may assign permissions to the dreamset, with respect to access by other users. The permission scheme may be a simple arrangement, such as the mutually exclusive choice: (A) keep dream private to the user, or (B) allow all other users to view this dream and perform analysis of this dream. Additionally, more complicated permission schemes may be used. By assigning viewing permissions, the cross-correlation, query, data fusion, or other operations performed by other users will either include the saved dreamset or will be denied access to it. The standard relational database and data base management can be used to implement viewing permissions as well.

Finally, note that the user may save the dreamset data at any point in the process. The user may also perform database maintenance, such as renaming 70, deleting 72 and assigning or re-assigning permissions 74 at any point in the process, as shown in FIG. 6.

FIG. 7 is a flowchart wherein the dream, interpretation, or analysis content is updated and comments can be added. Generally, the user may directly change the text which constitutes the dream entry and re-run the interpretation and analysis tools at any time during the dream interpretation sequence. The changes are accomplished using standard GUI editing conventions in the dream entry window 12. However, the functionality shown in FIG. 7 extends this feature in three ways. First, the user may change dream content but still retain a record of the original content 76. These changes can be layered on top of the existing dream, and may be utilized to explore different possibilities, update content based on future events, and change or add to dream endings. Since the changes become an "addition" to the entered dream, they may be processed by any operation available to the original dream content. Second, the user may change any of the text output from the tool 78. These changes will replace the original text for that particular dreamset. Third, the user may associate comments with arbitrary portions of dream content or any other visible text (i.e. text output from the tool) 80. Finally, files or multimedia content may be associated with arbitrary portions of dream content 81.

To update or change some or all of the dream content 76, the user highlights the portion of dream content to be updated 82. The user then activates the layering feature and types over the highlighted section of text 84. At any time, the user may select the current changes, or any previously entered version to be part of the dream. In a similar manner, the text output may be changed by following standard GUI editing conventions 86 88. Additionally, comments may be added by first highlighting the portion of text to which they are associated 90, 92. (If a comment is generic and not to be associated with anything, this step is omitted.) Next, the user types in their comments 90, 92. These comments may be made to present themselves when the highlighted text becomes active in the future.

Becoming active attains focus either through automated dream analysis tools or manually through selection by the user. Finally, in a manner 91 similar to the addition of comments 90, the user may associate other files with dream content 93.

These associations can be made visible or otherwise available to the user whenever the highlighted text becomes "active".

Figure 8:
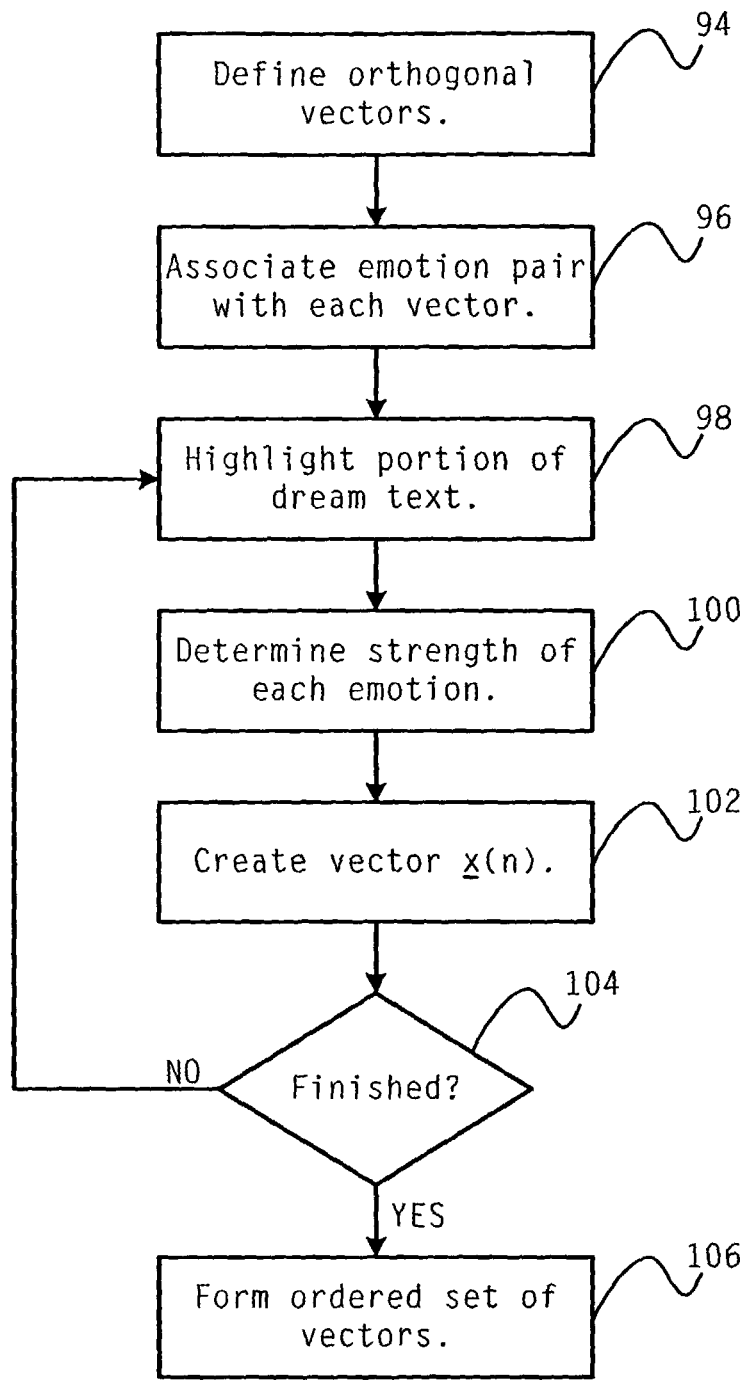
FIG. 8 is a flowchart of one embodiment showing the steps associating emotions with a dream.
Figure 9:
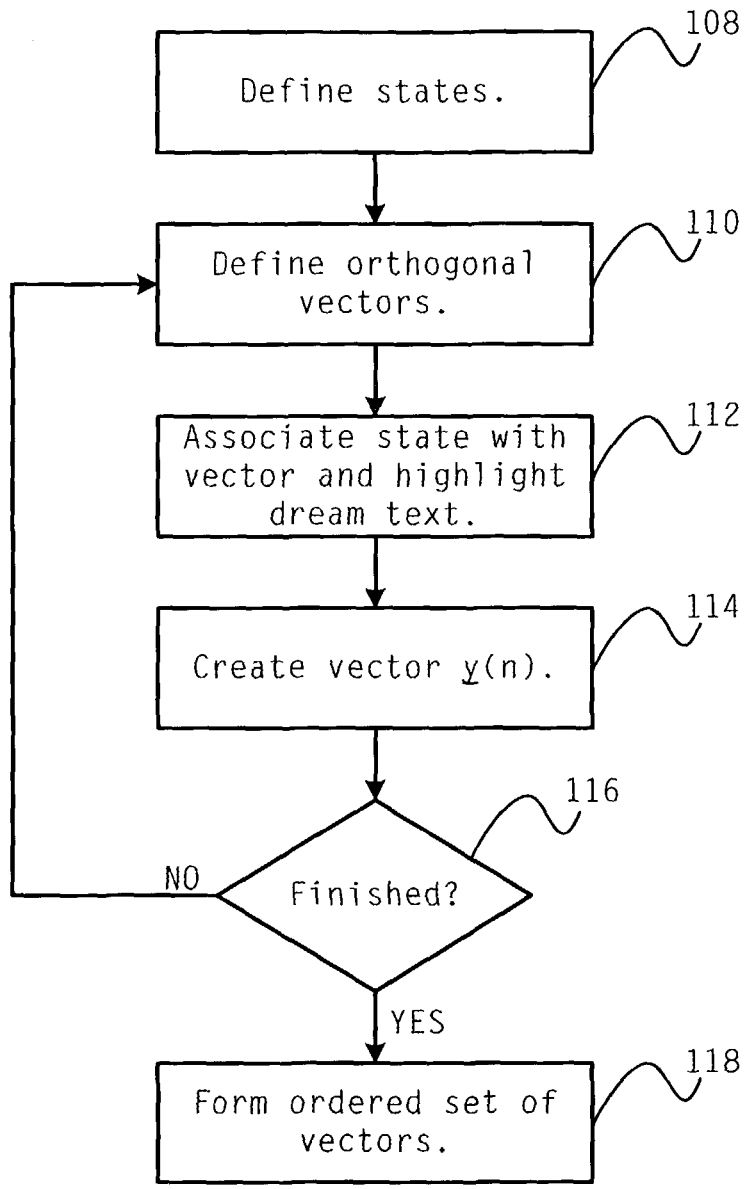
FIG. 9 is a flowchart of one embodiment showing the steps of defining and associating states with dream content.

To support or enhance the Analysis Engine (described in the next section), additional data, such as various mental states, may need to be entered into the dreamset. This process is shown in FIGS. 8 and 9, and at a basic level includes (A) emotional information, and/or (B) dream state. All information is entered using standard computer user I/O techniques, such as GUI dialog boxes or equivalent. The process comprises associating vectors (defined as elements of a certain space) with portions of dream content. When the process is complete, a dataset is created with a sequence of vectors, related in a time-order to the progression of the dream. (A) and (B) differ in the number of elements in each vector (the dimension of the space) and the meaning association of each component of the vector as defined by the user or as inherent in the program.

FIG. 8 shows the procedure for associating emotions with a dream. More specifically, the process defines the mathematical representation of emotions and allows the user to associate the emotions present in a dream with this mathematical construct 94. With respect to defining the representation, the directions of each component of a given vector are assumed to be orthogonal and that a set of vectors exists which is defined to represent (i.e. one-to-one correspondence with) the "direction" of each individual emotion. As a result, this set of vectors forms a basis for the user emotion-space and a user-defined linear combination of these basis vectors is sufficient to define any user emotion within the defined space.

As noted above, the vectors in emotion space are defined such that there is a one-to-one correspondence between each element and the presence of a unique emotion chosen from the elements of a set of independent user's emotions 96. The elements of a vector are chosen to represent the strengths of each emotion, as experienced during the highlighted section of the dream 98. A set of vectors in which each vector represents a unique emotion form a basis by which the emotion space of the dreamer is spanned (i.e. an emotion vector is sufficient to specify the dreamer's emotions at any given time). As an example, for a vector consisting of elements $v_i$, $v_1$ may represent hate/love, $v_2$ may represent sorrow/joy and $v_M$ may represent anger/peacefulness. In time sequence ordered by the progression of the associated dream text, enough such vectors are specified to completely describe the emotional progression of the entire dream, in a discrete-time manner.

The elements of the vector are each chosen from a user-defined set, of similar form to the following:

(vector component or element) $\in \{-K, -K+1, \ldots, -1, 0, 1, \ldots, K-1, K\}$, where $-K$ represents maximum "negative" emotion, $-1$ represents minimum "negative" emotion, 0 represents no such emotion, $+1$ represents minimum "positive" emotion and K represents the maximum positive emotion. The integers between $+1$ (or $-1$) and $+K$ (or $-K$) are assigned such that the resultant vectors proportionally span these extremes 100. An ordered set of such vectors then represents the dreamer's emotions as loose functions of time. Positive/negative emotions are defined as pairs of emotions which are mutually exclusive at a given point in time (for example love and hate). The above steps are repeated 104 so that emotions are defined for the entire dream. For each of the emotional associations created by the user, a vector $x(n)$ is created 102, where n is incremented to correspond to time progression through the dream text. The construction of emotion vectors is not a simple assignment of numbers to emotions, but is done within the context of creating vector functions of time, which are defined in a mathematical linear space. Upon creation of all the emotional associations, an ordered set of vectors $\{x(0), x(1), \ldots x(N)\}$ is created 106 representing the user's emotional progression throughout the dream.

Similarly, as shown in FIG. 9, vectors in dream state-space are defined such that there is a one-to-one correspondence between each element and unique states chosen by the user 108. The given state may be considered beneficial (positive state) or detrimental (negative state) to the user. For example, the first state of a vector may represent how much the dreamer feels in (or out of) control of events. The second state may represent the physical well-being (or illness) of the dreamer. The third state may represent his/her spiritual state in terms of light (or darkness). The elements of such a vector would represent how much in control the dreamer is, how healthy he or she is, and how spiritually consistent he or she is during a given dream segment.

An arbitrary number of such vectors may be defined by the user to represent any state they care to define 110. The user can be thought of as defining an arbitrary-length state vector, which is partitioned into "sub-vectors" having specific meaning to the user 112. The process is guided by the user's concerns and preferences in terms of grouping things into these vectors and sub-vectors. This above procedure can be repeated such that states are defined for the entire dream 116. For each of the states created by the user, a vector $y(n)$ is created 114, where n is incremented to correspond to time-progression through the dream text. The construction of state vectors is not a simple assignment of numbers to states, but is done within the context of creating vector functions of time, which are defined in a mathematical linear space. Upon creation of all the states, an ordered set of vectors $\{y(0), y(1), \ldots y(N)\}$ is created 118 representing the user's state progression throughout the dream.

In addition, vectors can be assigned to provide representations, such as the user's desired state, within dream state-space or current real-life state. In the dream state-space, vectors identical to those of described above can be defined, but assigned by the user based on a desired state during the progression of the dream instead of the actual. This can be used to support more advanced forms of processing, data analysis and artificial intelligence.

Analysis Engine

The Analysis Engine performs tasks which are based on the user's dream input and the resultant processing, as described above. With the entry of additional data, as described above, analysis capabilities are enhanced. Subsequent to this step, operation of any of the analysis components is performed by the user through simple initiation of an algorithm. Some components may require additional user input and may present graphical or text data for review by the user.

A plurality of tools are present through which a user may analyze a user's dreamset history. The dreamset history comprises all of a user's dreamsets, and more generally is extended to include the "shared" dreamsets of other users. The user may analyze the data through a graphical presentation of the data, a history search based on date, keywords, dream content, and/or emotional content. Further the user may perform a dreamset autocorrelation, cross-correlation, and/or data fusion.

Graphical Analysis

As noted above, a graphical presentation tool allows dream data entered by the user to be plotted as functions of time (index) or other data for a given dream and presented to the user in a graphical format. For example, a plot may show emotion_1 vs. time, emotion_1 vs. emotion_2, or both emotion_1 and emotion_2 vs. time (a 3-dimensional plot). This may be performed in a manner similar to various commercial graphing/plotting programs which are currently available.

The plots may be configured to present the same data types, but with the points taken from the history of dreams, or a subset of the history of dreams.

Historical Analysis

In addition, a user may analyze dream data through a historical analysis tool. This tool provides a means to record a user's dream content, interpretations, and associated information as functions of time. This permits the user to (1) become aware of recurrent themes, (2) trace progressions, (3) revisit dreams with knowledge obtained in subsequent dreams, (4) validate or change definitions based on future events, (5) perform queries on various subjects or events to identify past dreams concerning said subject or event, and (6) provide analysis capabilities over the set of past and present dreams.

The processing of the user's dreamset history involves two elements. First, a method by which the user can be made aware of a particular dreamset or group of dreamsets out of the complete set of history dreamsets is employed. As shown in FIG. 10A-FIG. 10D, search options allow a user to identify past dreamsets predicated upon (A) date (or range of dates), (B) keyword presence, (C) dream content or (D) emotional content. Invoking a search option produces a ranked list for selection of a particular dreamset for viewing, or re-application of additional search criteria.

Figure 10A:
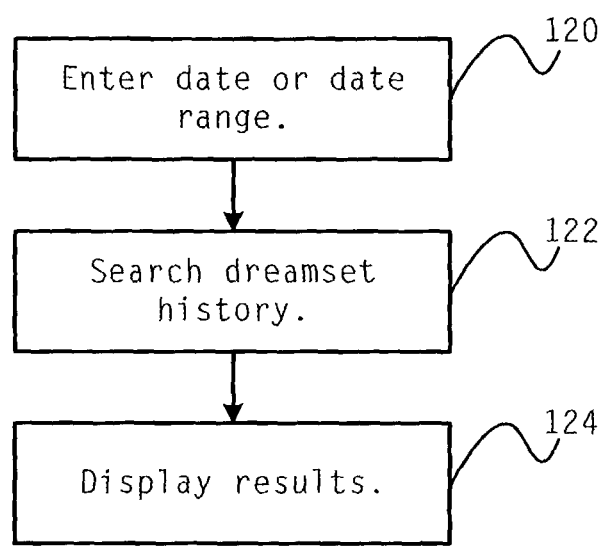
FIG. 10A is a flowchart of one embodiment of the steps of performing a history search based on date.

FIG. 10A is a flowchart of a history search based on date. The user begins a search by entering a specific date or a date range for a search 120. The start and end dates for the search are referred to as "search_start_date" and "search_end_date", respectively. The dreamset history is searched 122 for all dreams which satisfy:

(dream_date associated with a dreamset from the history)=(search_date)

or (dream_date associated with a dreamset from the history)≥(search_start_date)

and (dream_date associated with a dreamset from the history)≤(search_end_date).

The dreamsets identified in the search are presented to the user in a list which displays the dates found in the search and allows selection by the user to become the active dreamset 124. Further, the list may show other items pertaining to each dreamset and may be sorted by any of the displayed fields.

Figure 10B:
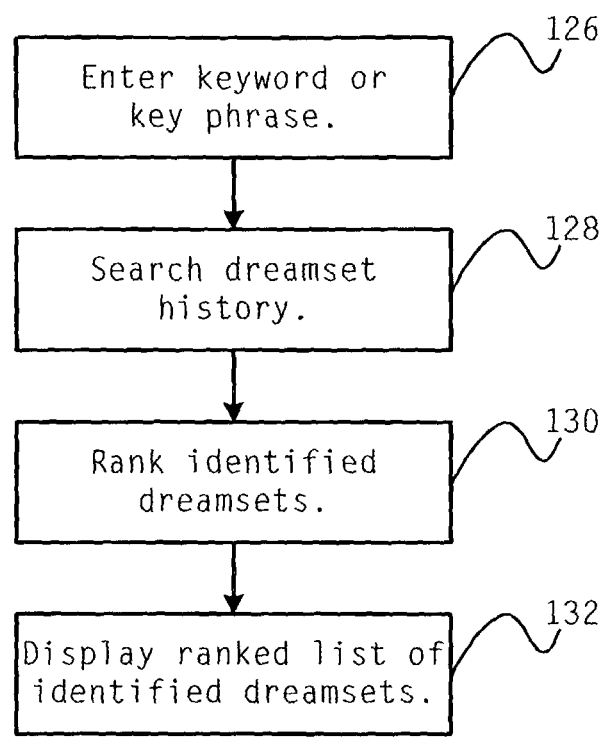
FIG. 10B is a flowchart of one embodiment of the steps of performing a history search based on the presence of particular words.

FIG. 10B is a flowchart of a history search based on the presence of particular keywords. The user begins by entering a keyword or a key phrase 126. The dreamset history is searched to identify the number of occurrences of the keyword or key phrase in each dream 128 and the results are ranked based on the number of occurrences 130. This list is subsequently presented to the user 132. The list does not display the dreams in which the keyword or the key phrase was not present. The list may show other items pertaining to each dreamset and may be sorted by any of the displayed fields. The user may then select any of the dreamsets displayed to become the active dreamset.

Searching by dream content and emotional content require steps in addition to those when searching based on date of keywords. With dream content searching, a set of content-related words based on similarity of meanings (a thesaurus) is first created. A score is then generated which rates a past dream with respect to the presence of these words. With emotional content searching, dreamsets in the history are ranked based on the proximity of their emotion sequences to a user-defined emotional state.

Figure 10C:
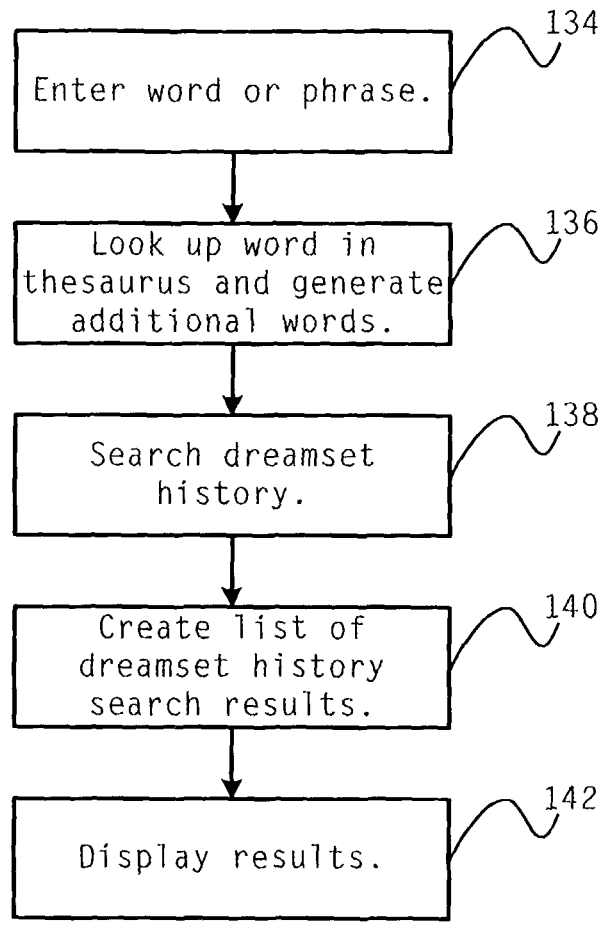
FIG. 10C is a flowchart of one embodiment of the steps of performing a history search based on dream content.

FIG. 10C details the steps of performing a history search based on dream content. First, the user enters a word or phrase, $w_0$ 134. The word or phrase, $w_0$, is looked up in the thesaurus which generates a set of (unique) additional words and phrases $\{w_1, w_2, \ldots, w_T\}$ 136. These additional words or phrases share a similar meaning with $w_0$. This relationship is specified by the thesaurus, which may be commercially available or specifically created or modified for this application. The word or phrase, $w_0$, and the additional words, $\{w_1, w_2, \ldots, w_T\}$, generated in the thesaurus search merge to form a set $A=\{w_0\} \cup \{w_1, w_2, \ldots, w_T\} = \{w_0 w_1, w_2, \ldots, w_T\}$. This set is then used in the history search. It should be noted that in addition to the words in set A, the parts of speech associated with the words may also be considered in the search.

The dreamset history is searched 138 and the following calculations are performed for each dream in the set of dreams to be searched:

Suppose $w_i = \{\phi_{i1}, \phi_{i2}, \ldots, \phi_{iR(i)}\}$, where $w_i$ is the $i^{th}$ element of the search set A, R(i) equals the number of words in the phrase $w_i$, and $\phi_{ij}$ are the words which comprise the search phrase. Note that if $w_i$ is a single word (and not a phrase) then R(i)=1.

Further, suppose that the $k^{th}$ dream to be searched is represented by the ordered set of words, $D_k = \{d_{k0}, d_{k1}, \ldots, d_{kQ(k)}\}$, where $d_{k0}$ is the first word in the dream, $d_{k1}$ is the second word in the dream, etc. and $d_{kQ(k)}$, is last word in the dream. Note that the dream consists of Q(k)+1 words.

The "hit index", $H_{ik}$, of word/phrase $w_i$ in dream $D_k$ is computed by $$H_{ik} = \sum_{j=0}^{Q(k)-R(i)+1} \alpha_{ijk}$$

where $\alpha_{ikj}=1$, if $(d_{kj}=\phi_{i1}) \wedge (d_{kj+1}=\phi_{i2}) \wedge \ldots \wedge (d_{kj+R(i)-1}=\phi_{iR(i)})$ 0, if $(\alpha_{ikj}=1) \wedge (J<j<J+R(i))$ 0, otherwise.

This "hit index" is then normalized to define a "score" for the $k^{th}$ dream searched.

$$\Gamma_k = \frac{\sum_{i=0}^{T} H_{ik}}{(Q(k)+2)(T+1) - \sum_{i=0}^{T} R(i)}$$

The set of searched dreams is ranked based on the "score" $\Gamma_k$ and a list is created which provides information about each dream ordered by the associated indicies $\Gamma_k$ 140. Such information may include the date created and/or the filename. The ranked list is then displayed to the user 142. The list does not display the dreams in which a "score" of zero was obtained. Further, the list may show other items pertaining to each dreamset and may be sorted by any of the displayed fields. The user may then select any of the dreamsets displayed to become the active dreamset.

Figure 10D:
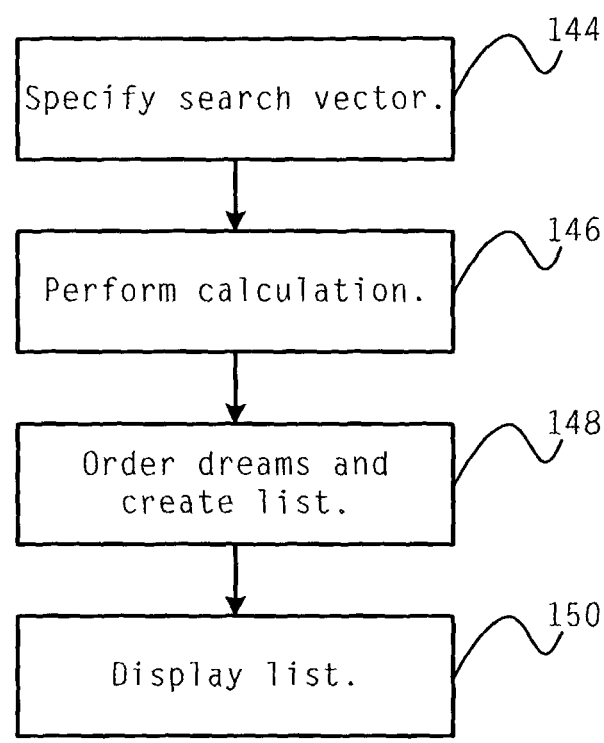
FIG. 10D is a flowchart of one embodiment of the steps of performing a history search based on dream emotional content.

As noted above, emotional content in dreamsets are ranked based on the proximity of their emotion sequences to a user-defined emotional state. FIG. 10D is a flowchart detailing the steps of performing a history search based on dream emotional content. First, the user defines an emotion by specifying a search vector $x_c$, in M-dimensional emotion space 144. The following calculations are performed 146 for each dream in the set of dreams to be searched:

Suppose that the $k^{th}$ dream to be searched is represented by the ordered set of words, $D_k = \{d_{k0}, d_{k1}, \ldots, d_{kQ(k)}\}$, where $d_{k0}$ is the first word in the dream, $d_{k1}$ is the second word in the dream, etc. and $d_{kQ(k)}$, is last word in the dream. Note that the dream consists of $Q(k)+1$ words.

Two "cost functions" are defined as follows (applied to the $k^{th}$ dream):

$$\Gamma_k^{(1)} = \sum_{n=0}^{N_k} \sum_{i=1}^{M} (x_{ki}(n) - x_{ei})^2$$

$$\Gamma_k^{(2)} = \min_n \left( \sum_{i=1}^{M} (x_{ki}(n) - x_{ei})^2 \right)$$

where $x_{ei}$ is the $i^{th}$ component of the user-defined search vector, $x_e$, $X_{ki}(n)$ is the $i^{th}$ component of the dream emotion vector $x_k(n)$, $x_k(n)$ is the emotion vector associated with dream k at time n, M is the number of components in an emotion vector, and $N_k+1$ is the length of the emotional sequence of dream k.

Here, $\Gamma_k^{(1)}$ is a measure of the overall closeness of dream k's emotional sequence to the search emotion, and $\Gamma_k^{(2)}$ is a measure of how close dream k's emotional sequence actually got to the search emotion. After $\Gamma_k^{(1)}$ and $\Gamma_k^{(2)}$ have been calculated for every dream in the search set, the dreams are ordered based primarily on $\Gamma_k^{(1)}$ and secondarily on $\Gamma_k^{(2)}$ or vice versa 148. A list is created providing information about each dream in the order specified above. The been calculated for every dream in the search set, the dreams are ordered based primarily on $\Gamma_k^{(1)}$ and secondarily on $\Gamma_k^{(2)}$ or vice versa 148. A list is created providing information about each dream in the order specified above. The information may include date and/or filename. The ranked list is then displayed to the user 150. The list may show other items pertaining to each dreamset and may be sorted by any of the displayed fields. The user may then select any of the dreamsets displayed to become the active dreamset.

Autocorrelation

The second method by which dreamset histories are used involves use of additional tools to identify trends and similarities in the data. These tools are referred to as auto- and cross-correlation, and are discussed below.

Autocorrelation provides a module for relating the content, emotional data, and arbitrary state data of a person's dream history to a time-shifted version of the same history. Such processing is utilized to identify recurrent content, patterns, meanings, and other significant information. Although the term autocorrelation is utilized in the following description, the function utilized may be any generalized function which performs a measurement of similarity between dream histories.

Autocorrelation considers a single user's dream history to be continuous in sections over an interval, with each section representing an independent dream. Autocorrelation uses one dream out of the set of all available dreamset history and parameterizes the content as a vector function defined in a linear space. The parameterization takes the form of vector sequences associated with the dream text, so that the dream can be represented as a point which varies over time, but not necessarily as a direct function of time. The vector associations can take place in a somewhat automatic manner, with the process provided in FIG. 11 described below. However, the emotion and state vector sequences can also be used (if they have been associated by the user).

Figure 11:
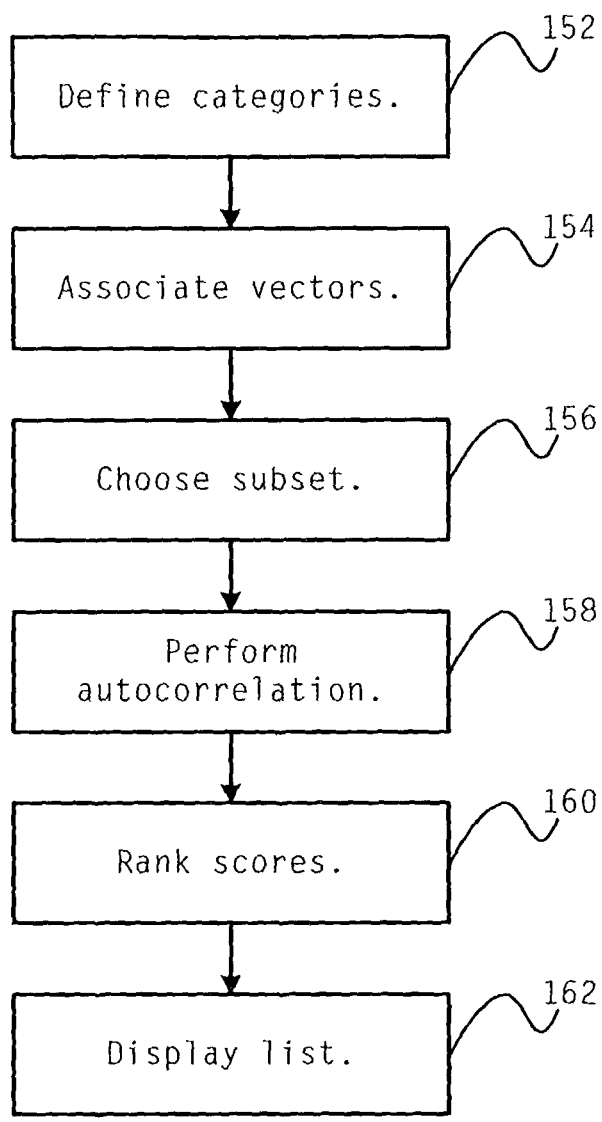
FIG. 11 is a flowchart of one embodiment of the steps of performing a dreamset autocorrelation; and, FIG. 12 is a flowchart of one embodiment of the steps of performing a dreamset cross-correlation.

FIG. 11 is a flowchart describing the procedure for performing a dreamset autocorrelation. While this presentation describes a specific association of vectors with dreams, the emotion/state vectors previously described may be used. Further, the autocorrelation process is specifically applied to dream text, but could also be applied to any of the other text which comprises a dreamset, including interpretations and comments.

First, categories are defined which represent the ideal state of the user and others. Such categories may include, for example, physical well-being of self, emotional well-being of self, social well-being of self, spiritual well-being of self, physical well-being of others, emotional well-being of others, social well-being of others, and spiritual well-being of others 152. A vector is associated with each entry in the collective and user dictionaries which defines how the presence of that word in a dream will affect each of the defined categories 154. This is done in a manner similar to emotion and state vector definitions, where an integer from $-L$ to $+L$ is chosen for each component. However, during autocorrelation, $-L$ represents maximal movement away from the desired state, $-1$ represents minimal movement away from the desired state, 0 represents no impact on the desired state, $+1$ represents minimal movement toward the desired state, and $+L$ represents maximal movement toward the desired state. Note that the vector definitions are relative changes with the optimal desired state of infinity in all directions.

The user then chooses a subset $\Phi$ of their history or another's history to perform an autocorrelation over 156, where $\Phi \subseteq H$, and H is the specified user's entire dreamset history. All of the dreams present in $\Phi$ are assigned unique (integer) indices k, $1 \leq k \leq K$. For each k, the presence of dictionary entries in a dream $D_k$ is used to create an ordered sequence of the vectors. This vector sequence is represented by $\{x_k(n)\}$.

For each k in the sequence $\{1, 2, \ldots, K\}$, the following calculation is performed 158 for $j \in \{k+1, k+2, \ldots, K\}$ for the $m^{th}$ component of the vector sequences:

$$R_m(k, j, \lambda) = \frac{1}{\min(N_k, N_j - \lambda) - \max(0, -\lambda) + 1} \cdot \sum_{n=\max(0,-\lambda)}^{\min(N_k, N_j - \lambda)} x_{km}(n) \cdot x_{jm}(n + \lambda)$$

for all integer $\lambda$ such that $\min(N_k, N_j - \lambda) \geq \max(0, -\lambda)$, or $-N_k \leq \lambda \leq N_j$ where $N_k+1$ is the length of the meaning vector sequence for dream $D_k$, $N_j+1$ is the length of the meaning vector sequence for dream $D_j$, $x_{km}(n)$ is the $m^{th}$ component of the vector sequence $x_k(n)$, $x_k(n)$ is the vector "meaning" sequence associated with dream $D_k$, $x_{jm}(n)$ is the $m^{th}$ component of the vector sequence $x_j(n)$, and $x_j(n)$ is the vector "meaning" sequence associated with dream $D_j$.

This measure is extended to include all M components of the vector sequence:

$$R(k, j, \lambda) = \sum_{m=0}^{M} R_m^2(k, j, \lambda)$$

Finally, scores $\Gamma^{(m)}_{jk}$ and $\Gamma^{T}_{jk}$ are computed for each dream pair $\{D_j, D_k\}$, over $\lambda$ such that $-N_k \leq \lambda \leq N$ with $\lambda \in \{\text{Integers}\}$:

$$\Gamma^{(m)}_{jk} = \max_\lambda (R_m^2(k, j, \lambda))$$

where $1 \leq m \leq M$.

$$\Gamma^{T}_{jk} = \max_\lambda (R(k, j, \lambda))$$

The "scores" $\Gamma^{(m)}_{jk}$ or $\Gamma^{T}_{jk}$ are ranked 160, such that a list of corresponding dream pairs is established, ordered by their correlation with each other. This list provides one line of information about each dream (date, filename, etc.). The ranked list is then displayed to the user 162. The list may also show other items pertaining to each dreamset, and may be sorted by any of the displayed fields.

The second means of processing dream data is defining functions (such as polynomial) in the dream world, which are optimally fitted (e.g. minimum mean-squared error) to each dream's vector sequence described above. Then, the aforementioned steps can be completed, but for continuous functions rather than for discrete-time functions. Note that the vectors in dreamspace can be based on emotional/state content or dream meaning. As mentioned above, a vector in the emotional/state content subspace of dreamspace is produced by defining a set of emotions or states, for which there is a one-to-one correspondence to elements of the vector. In this manner a vector can span the emotion/state space. The particular values of a vector are associated with keyword "definition additional data" and are either defined in the dictionaries or by the user while using the system.

Cross-Correlation

As noted above, another method by which historical data is used involves cross-correlation. Generally, cross-correlation provides a means of relating the content, emotional data or arbitrary state data of one dream to the same of another dream by the same person, or some subset of their own dream history. Further, cross-correlation provides a means of relating the content, emotional data or arbitrary state data of one person's dream or subset of their dream history to the same of another person's dream, or to some subset of this other person's dream history. Such processing is utilized to identify similarities between a given dream and the dream history of that person or others. Although, the word "crosscorrelation" is utilized in the following description, it is intended to describe functions which measure the similarity of two or more dreams. Cross-correlation is applied within a framework by which permissions can be established to grant or prohibit access to each dream by others, for purposes of this analysis, based on certain criteria. Note that this cross-correlation capability can be generalized and extended to groups of people using the function. In such a scenario, this feature can provide a new capability which includes but is not limited to application in sociological research, classroom (educational) experiments, dating services (in providing additional compatibility information) and games, marketing studies, genealogy and genetic research, and medical diagnosis.

Similar to autocorrelation, cross-correlation provides similar functionality but is applied for a user-specified dream with other dreams in their history, or with each visible dream of another user's history. "Visible" dreams include those dreams that the user has allowed others to access. From this, a cross-correlation index is created to allow ranking and identification to the user of dreams which share similar content or patterns. The user can then select and view both his/her and the other user's dreamsets present on the list.

Figure 12:
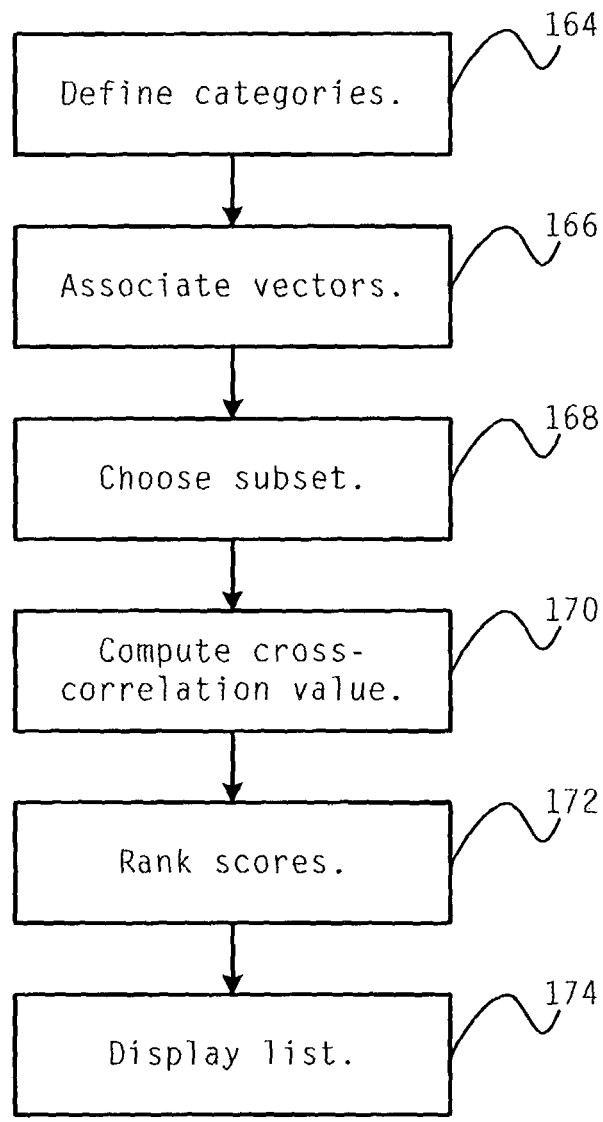

FIG. 12 is a flowchart describing the procedure for performing a dreamset cross-correlation. While this presentation describes a specific association of vectors with dreams, the emotion/state vectors previously described may be used. Further, the cross-correlation process is specifically applied to cross-correlation between dream text, but could also be applied to any of the other text which comprises a dreamset, including interpretations and comments.

First, categories are defined which represent the ideal state of the user and others. Such categories may include physical well-being of self, emotional well-being of self, social well-being of self, spiritual well-being of self, physical well-being of others, emotional well-being of others, social well-being of others, and spiritual well-being of others 164. A vector is associated with each entry in the collective and user dictionaries and defines how the presence of that word in a dream will affect each of the defined categories 166. This is done in a manner similar to autocorrelation, where an integer from $-L$ to $+L$ is chosen for each component. However, during cross-correlation, $-L$ represents maximal movement away from the desired state, $-1$ represents minimal movement away from the desired state, 0 represents no impact on the desired state, $+1$ represents minimal movement toward the desired state, and $+L$ represents maximal movement toward the desired state. Note that the vector definitions are relative changes with the optimal desired state of infinity in all directions. The presence of dictionary entries in the current dream $D_0$ is then used to create an ordered sequence of the vectors. The vector sequence will be represented by $\{x_0(n)\}$.

The user then chooses a subset $\Phi$ of their history or another's history to perform a crosscorrelation over 168, where $\Phi \subset H$, and H is the specified user's entire dreamset history. All of the dreams present in $\Phi$ are assigned unique (integer) indices k, $1 \leq k \leq K$. For each k, the presence of dictionary entries in a dream $D_k$ is used to create an ordered sequence of the vectors. This vector sequence is represented by $\{x_k(n)\}$.

For every dreamset in $\Phi$, a cross-correlation value is computed. First, a cross-correlation function is calculated 170 for the $m^{th}$ component of the vector sequences in the following manner:

$$R_m(0, k, \lambda) = \frac{1}{\min(N_0, N_k - \lambda) - \max(0, -\lambda) + 1} \cdot \sum_{n=\max(0,-\lambda)}^{\min(N_0, N_k-\lambda)} x_{0m}(n) \cdot x_{km}(n + \lambda)$$

for all integer $\lambda$ such that $\min(N_0, N_k - \lambda) \geq \max(0, -\lambda)$, or $-N_0 \leq \lambda \leq N_k$ where $N_0 + 1$ is the length of the meaning vector sequence for dream $D_0$, $N_k+1$ is the length of the meaning vector sequence for dream $D_k$, $x_{0m}(n)$ is the $m^{th}$ component of the vector sequence $x_0(n)$, $x_0(n)$ is the vector "meaning" sequence associated with dream $D_0$, $x_{km}(n)$ is the $m^{th}$ component of the vector sequence $x_k(n)$, and $x_k(n)$ is the vector "meaning" sequence associated with dream $D_k$.

This measure is extended to include all M components of the vector sequence:

$$R(0, k, \lambda) = \sum_{m=0}^{M} R_m^2(0, k, \lambda)$$

Finally, scores $\Gamma^{(m)}_k$ and $\Gamma^T_k$ are computed for each dream $D_k$, over $\lambda$ such that $-N_k \le \lambda \le N_j$ with $\lambda \in \{\text{Integers}\}$:

$$\Gamma_k^{(m)} = \max_\lambda (R_m^2(0, k, \lambda))$$

where $1 \le m \le M$.

$$\Gamma_k^T = \max_\lambda (R(0, k, \lambda))$$

The "scores" $\Gamma^{(m)}_k$ or $\Gamma^T_k$ are ranked 172, such that a list of corresponding dreams is established, ordered by their correlation with dream $D_0$. This list provides one line of information about each dream (date, filename, etc.). The ranked list is then displayed to the user 174. The list may also show other items pertaining to each dreamset, and may be sorted by any of the displayed fields.

Data Fusion

As noted above, the user may perform a data fusion to analyze dream data. Data fusion provides a means by which information about a given subject can be combined from the dreams of many people, such that more accurate and complete information can be provided about the subject. Data fusion is extremely powerful because it allows the subconscious thoughts of a plurality of people to be combined to yield a super-subconscious. This super-subconscious can be utilized to guide counter-terrorism operations, identify suspects and suspicious activity, identify targets, and identify unconventional attacks (such as degradation in a community's health due to a biological attack) across geographical locations. Data fusion can be further extended by combining the dream-data with other data types, such as the dreamer's physical location, to yield a fusion capability of unlimited dimension. In addition, the data fusion capability provides a means by which metrics on peoples' emotions, health or other subconscious thoughts are evaluated. For example, an index of expectations with respect to the economy can be derived based on dream content and emotional progressions. The data fusion applications thus can range from application to national or global issues, or on a smaller scale to application in a classroom environment for educational purposes, or within a family or group of friends for entertainment and learning.

As noted, data fusion is a process of improving a description or model by combining multiple observations. Given a certain description, additional information can either support or contradict the currently known elements of that description. In the context of dreams, data fusion utilizes the subconscious thoughts of individuals as sensorial observations of an environment. In the same manner that a picture provides information about an object, it also provides information about the light source. Combination of many pictures across different objects and different light sources increases the potential information which can be obtained about both. Thus, the subconscious thoughts of an individual are dependent both on that person's composition and their environment.

It should be noted that there are many methods utilized in accomplishing data fusion because data fusion can encompass any type of data. However, by establishing how the present invention can be looked upon as a target identification "sensor", it will be clear to those skilled in the art how sensor or data fusion can be implemented. Also, it should be noted that similar processes may be utilized in the fusion of information and/or knowledge, to the extent these differ from "data".

The steps involved in obtaining a sensor output are described herein. A target classification sensor classifies a target in some sense, with respect to properties which are not deterministically known. For example, a target may be a missing person, a property of the target may be its location, and a classification may be a subset of possible locations. When exposed to a given target, the sensor will generate an output which indicates its decision on the property or properties of the target. For example, when exposed to information about the missing person target, the sensor decision may be, for example, "the target is located in the country Y". Another sensor may make the decision that "the target is located near a river". A given sensor's performance may be represented by a matrix showing the probability of a certain sensor output given a certain real target that it is "looking at". At the next higher level, a rule is used to combine the outputs from the individual sensors to make a consolidated decision. Based on this, the probability of a correct overall decision is greater than that of an individual sensor.

In the present invention, artificial intelligence may be used to generate a certain classification output based on a given dream. The functionality would be utilized to validate a certain statement, such as "object_B is located in place_Y". In this example, the artificial intelligence may simply be the mutual presence of the words "object_B" and "place_Y" within the same dream. Hence, given the presence of these two words, there would be a certain probability that the statement "object_B is located in place_Y" is true, another probability that this statement is false, and yet another probability that the dream is irrelevant in deciding the truthfulness of this statement. These probabilities depend both on the capability of the artificial intelligence algorithm, and the real-life accuracy of the dream. Experimentation may be performed to quantify the relative frequency estimates of these probabilities based on currently known truth, and with the present and past dreams of a user.

Once a decision is made at the local level by a single user, these decisions are combined according to some rule to produce a consolidated decision. The decisions and probability estimations can be obtained through such means as connection to a central computer or website which is responsible for performing the fusion. Generally, the individual dreams and their analyses may be a part of the individual user's machines, or may be located on the central computer, or may be distributed as required. In effect, the present invention can implement sensor fusion in a novel manner, making use of human sensors and processing in place of the customary hardware sensors.

In addition to the uses described above, dreamset data of an unlimited number of users may be stored in a large database. This information may be utilized in research to further understand and advance the subject of dreams within the field of psychology. Moreover, user-entered definitions or alterations of definitions can be stored to create a superset of newly created dream associations. This information may be processed by human or machine intelligence to produce a new model of collective dream definitions. This process can take place in realtime and may be adjusted to provide unique updates with respect to individual cultures or other demographic elements.

While the specific embodiments have been illustrated and described, numerous modifications come to mind without significantly departing from the spirit of the invention and the scope of protection is only limited by the scope of the accompanying claims.

We claim:

1. A computer program product for interpreting a thought, the computer program product comprising:
 a computer-readable medium containing a code, the code comprising:
 a first code segment for receiving a plurality of portions of a thought entry;
 a second code segment for associating each of the plurality of portions of the thought entry with respective definitions or vectors, wherein each of the definitions or vectors represents at least one of an emotion value and/or a state value associated with each of the respective plurality of the portions of the thought entry, wherein the emotion values and or the state values represent the emotions and/or states of the respective plurality of portions of the thought entry over time;
 a third code segment for creating a thought interpretation set;
 a fourth code segment for performing at least one of uploading, downloading, emailing, or electronically transmitting the thought interpretation set, wherein the code further comprises a fifth code segment for associating at least one of advertising or marketing information to the thought interpretation set.

2. The computer program product of claim 1 wherein the emotion value represents a positive or negative strength of emotion or a neutral value for the emotion.

3. The computer program product of claim 1 wherein the emotion value is selected from a group consisting of hate/love, sorrow/joy, and anger/peacefulness.

4. The computer program product of claim 1 wherein the state value is selected from a group consisting of a beneficial state and a detrimental state.

5. The computer program product of claim 1 wherein a first state includes a first state value representing how much a dreamer feels in control of events, a second state includes a second state value representing physical well-being strength of the dreamer, and a third state includes a third state value representing the dreamer's spiritual state strength in terms of light.

6. The computer program product of claim 1 wherein the code further comprises a fifth code segment for recalling an existing thought interpretation set.

7. The computer program product of claim 1 wherein the plurality of portions of the thought entry is at least one of an audible recording, a visual recording, a multimedia format, or a textual entry.

8. The computer program product of claim 1 wherein the code further comprises a fifth code segment for creating at least one definition.

9. The computer program product of claim 1 wherein the code further comprises a fifth code segment for recalling an existing thought from a memory to create the plurality of portions of the thought entry.

10. The computer program product of claim 1 wherein the code further comprises a fifth code segment for associating the thought interpretation set with additional definition information.

11. The computer program product of claim 1 wherein the code further comprises a fourth code segment for updating a definition wherein the updated plurality of definitions are the state value of at least one of the user's present relative conscious state or present subconscious state.

12. The computer program product of claim 1 wherein the marketing information includes at least one of a coupon or links to a website.

13. The computer program product of claim 1 wherein the association is user defined.

14. The computer program product of claim 1 wherein the definition is stored in a personal dictionary.

15. The computer program product of claim 1 wherein the definition is stored in a collective dictionary.

* * * * *